United States Patent
Guturi et al.

(10) Patent No.: US 10,635,632 B2
(45) Date of Patent: Apr. 28, 2020

(54) SNAPSHOT ARCHIVE MANAGEMENT

(71) Applicant: Cohesity, Inc., Santa Clara, CA (US)

(72) Inventors: Venkata Ranga Radhanikanth Guturi, San Jose, CA (US); Tushar Mahata, Cupertino, CA (US); Praveen Kumar Yarlagadda, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 269 days.

(21) Appl. No.: 15/689,704

(22) Filed: Aug. 29, 2017

(65) Prior Publication Data
US 2019/0065508 A1  Feb. 28, 2019

(51) Int. Cl.
*G06F 16/11*     (2019.01)
*G06F 11/14*     (2006.01)
*G06F 16/22*     (2019.01)
*G06F 16/13*     (2019.01)
*G06F 16/901*    (2019.01)

(52) U.S. Cl.
CPC ........ *G06F 16/113* (2019.01); *G06F 11/1464* (2013.01); *G06F 16/13* (2019.01); *G06F 16/2246* (2019.01); *G06F 16/9027* (2019.01); *G06F 2201/84* (2013.01)

(58) Field of Classification Search
CPC .... G06F 16/113; G06F 16/13; G06F 16/9027; G06F 16/2246; G06F 11/1464; G06F 2201/84
See application file for complete search history.

(56) References Cited

U.S. PATENT DOCUMENTS

| | | | |
|---|---|---|---|
| 6,671,853 B1 * | 12/2003 | Burkett | G06F 16/9574 715/235 |
| 7,039,663 B1 * | 5/2006 | Federwisch | G06F 11/1451 |
| 8,412,688 B1 * | 4/2013 | Armangau | G06F 16/128 707/695 |
| 8,620,973 B1 | 12/2013 | Veeraswamy | |
| 2005/0131917 A1 | 6/2005 | Auerbach | |
| 2006/0190469 A1 | 8/2006 | Kathuria | |
| 2009/0265516 A1 | 10/2009 | Prabhu | |

(Continued)

OTHER PUBLICATIONS

Serialization/Deserialization of a Binary Tree, Sep. 29, 2010, LeetCode, retrieved from the Internet <URL: http://articles.leetcode.com/serializationdeserialization-of-binary/ > (Year: 2010).*

(Continued)

*Primary Examiner* — James E Richardson
(74) *Attorney, Agent, or Firm* — Van Pelt, Yi & James LLP

(57) ABSTRACT

At least a portion of data of a tree data structure is serialized into a first set of flat data. At least a portion of a structure of the tree data structure is serialized to reproduce at least the portion of the structure in a second set of flat data. It is determined to access a desired data of the tree data structure from an archive. The second set of flat data is read to reconstitute at least the portion of a structure of the tree data structure. The reconstituted structure of the tree data structure is used to determine a data offset associated with the first set of flat data, wherein the data offset corresponds to the desired data. The desired data is accessed using the data offset associated with the first set of flat data.

20 Claims, 20 Drawing Sheets

(56) References Cited

U.S. PATENT DOCUMENTS

| | | | | |
|---|---|---|---|---|
| 2010/0191777 A1* | 7/2010 | Ylonen | ............... | G06F 9/547 |
| | | | | 707/803 |
| 2011/0099151 A1 | 4/2011 | Ylonen | | |
| 2015/0058442 A1 | 2/2015 | Raskin | | |
| 2015/0193487 A1 | 7/2015 | Demidov | | |
| 2016/0034356 A1 | 2/2016 | Aron | | |

OTHER PUBLICATIONS

PCT Written Opinion for PCT/US2018/045973, dated Oct. 19, 2018 (Year: 2018).*

European search opinion for EP 18190316, dated Dec. 17, 2018 (Year: 2018).*

Ogden et al. "Dat-Distributed Dataset Synchronization and Versioning." In: OSF Preprints. Apr. 2017. http://osf.io/nsv2c/f.

* cited by examiner

SNAPSHOT ARCHIVE MANAGEMENT

BACKGROUND OF THE INVENTION

A snapshot is the state of a system at a particular point in time. A full snapshot of a system may be composed of large amounts of data (e.g., terabytes, petabytes, etc.). Performing a full snapshot of a system at frequent intervals (e.g., hourly, daily) requires large amounts of storage to store the snapshots. To reduce the amount of storage required, an incremental snapshot of the system may be performed between full snapshots. An incremental snapshot includes the changes that have occurred to the system since the previous (full or incremental) snapshot. However, mounting a volume that includes a full snapshot and several incremental snapshots may require large amounts of storage.

For example, suppose a full snapshot of a system comprised of 1 TB of data was performed at t=0 and an incremental snapshot of 100 GB of data was performed at each t, from t=1 to t=10. Some of the data from an incremental snapshot may overwrite the data from the full snapshot and/or a previous incremental snapshot. However, to recover and mount the system at t=10 requires starting from the full snapshot at t=0 and adding each incremental snapshot to the system until the combined snapshots reproduce the state of the system at t=10. In this example, 2 TB of storage is required to recover the system comprised of 1 TB at t=10.

Although the above process reduces the amount of storage required to store the data, it increases the amount of storage needed to recover the data. It would be useful to not only reduce the amount of storage required to store the data, but also to reduce the amount of storage needed to recover the data.

BRIEF DESCRIPTION OF THE DRAWINGS

Various embodiments of the invention are disclosed in the following detailed description and the accompanying drawings.

DETAILED DESCRIPTION

Figure 1:
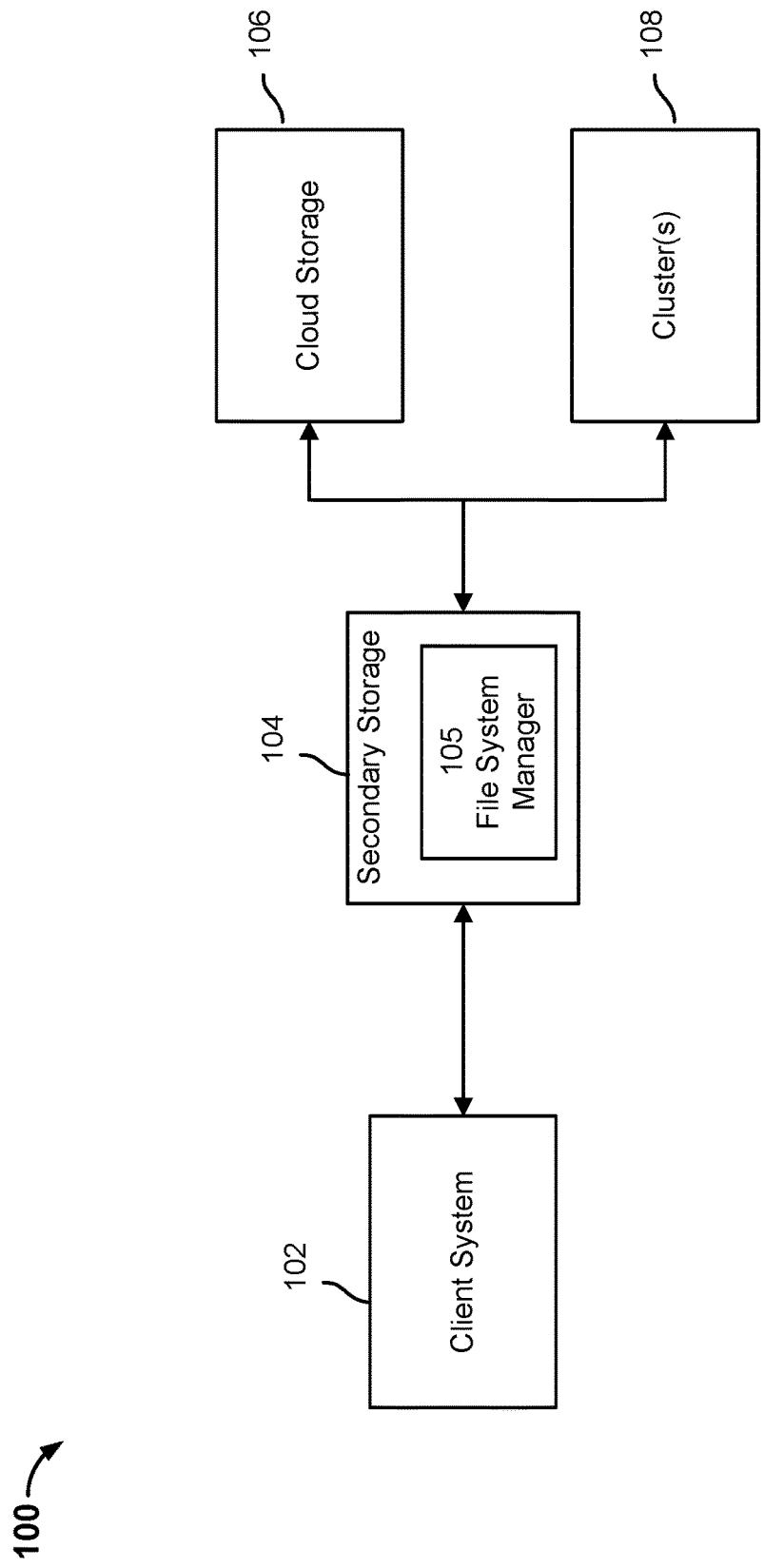
FIG. 1 is a block diagram illustrating an embodiment of a distributed storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Tree data structures may be used in organizing and storing large amounts of data. For example, a tree data structure is searched to retrieve a value stored in the tree data structure using a data key associated with the value. Often it is desirable to periodically archive the tree data structure to archive changes and provide fault tolerance. If the storage where the tree data structure is to be archived natively understands and supports tree data structures, it can be directly copied to the archive storage in a native format. However, many storage solutions do not natively support tree data structures. The storage solutions that natively support tree data structures are often costly and inefficient for use as an archive.

It may be more efficient to archive data to a storage/archive medium/system that is unable to natively support the tree data structure. For example, traditional third-party cloud storage solutions provide the ability to store computer files in a reliable manner but lack the ability to natively understand and support a tree data structure (e.g., does not natively provide the ability to perform tree data structure transactions). In some embodiments, to archive the tree data structure to such a storage medium, the tree data structure is serialized into a data file comprising a flat set of data. The serialized data file may be encoded in a manner that allows the serialized data file to be utilized to reconstruct a desired portion of the tree data structure to obtain a data of interest from the serialized data file without the need to reconstruct the entire tree data structure.

Snapshot archive management is disclosed. File system data may be stored in a tree data structure comprised of one or more snapshot trees. In some embodiments, a snapshot tree (e.g., Cohesity Snaptree) is based on a tree data structure and may include a root node, one or more intermediate nodes, and one or more leaf nodes associated with each intermediate node. The root node is the starting point of a snapshot tree and may include pointers to one or more other nodes. The root node includes an identifier that indicates a view with which the root node is associated. An intermediate node is a node to which another node points (e.g., root node, other intermediate node) and includes one or more pointers to other nodes. A snapshot tree may include one or more levels of intermediate nodes. A leaf node is a node at the bottom of a snapshot tree. A leaf node may be configured to store key-value pairs of file system data. In some embodiments, a leaf node includes a pointer to another snapshot tree. Each node of the tree data structure includes an identifier of a snapshot tree that identifies a tree data structure with which the node is associated (e.g., TreeID).

A snapshot of the file system data may be performed according to one or more backup policies. The backup policy may indicate when and how a snapshot of the system is to be performed. The snapshot of the system captures a view of the file system at a particular point in time. The view may be a current view or a snapshot view. A current view may represent a state of the file system that is up-to-date and capable of receiving one or more modifications to the snapshot tree that correspond to modifications to the file system data. A snapshot view may represent a state of the file system at a particular moment in time in the past and is not updated. The view of a snapshot may change from a current view to a snapshot view when a subsequent snapshot is performed. For example, a snapshot at t=1 may be a current view and accept one or more modifications to the snapshot tree. When another snapshot is performed at t=2, another root node is added to the tree data structure. The snapshot associated with t=1 at t=2 becomes a snapshot view and the snapshot at t=2 is a current view of the snapshot tree.

A tree data structure may be utilized to organize and store data associated with a snapshot (e.g., stored in a snapshot tree). The tree data structure can be used to capture different versions of file system data at different moments in time. In some embodiments, the tree data structure allows a chain of snapshot trees (i.e., different snapshot tree versions) to be linked together by allowing a node of a later version of a snapshot tree to reference a node of a previous version of a snapshot tree. Each time a snapshot is performed, a new root node may be created and the new root node includes the set of pointers included in the previous root node, that is, the new root node includes one or more pointers to an intermediate node or leaf node associated with a previous snapshot tree. However, the new root node includes a view identifier (e.g., TreeID) that is different than the view identifier (e.g., TreeID) of the previous root node. The view identifier associated with a node identifies a snapshot tree and view with which the node is associated. In some embodiments, the previous root node is deleted after a snapshot is performed. When a leaf node of a current view of a snapshot tree is modified, the snapshot tree is traversed from the root node of the current view to the leaf node. The view identifier associated with each intermediate node is compared with the view identifier associated with the root node of the current view. In the event the view identifier of the root node matches the view identifier of the intermediate node, the snapshot tree is traversed to the next node. In the event the view identifier of the root node does not match the view identifier of the intermediate node, a shadow copy of the node with the non-matching view identifier is made. The shadow copy includes the same set of pointers as the copied node, but includes a view identifier to match the view identifier of the root node and a different node ID. When the snapshot tree is traversed to the leaf node that is to be modified, the view identifier associated with the leaf node to be modified is compared with the view identifier associated with the root node of the current view, and a new leaf node is created. The new leaf node includes the modified value and a view identifier that matches the view identifier of the root node.

A snapshot policy may indicate that a full snapshot or an incremental snapshot is to be performed and stored at a storage system. The full snapshot may provide a complete view of the snapshot tree at a particular point in time, that is, the full snapshot stores all of the nodes associated with a snapshot tree at the particular moment in time. An incremental snapshot may provide a partial view of the snapshot tree at a particular moment time. The incremental snapshot may store the difference between a snapshot and a previous snapshot and one or more pointers to one or more nodes associated with one or more previous snapshots.

A snapshot may be archived to a remote storage system. Archiving a snapshot frees up storage that was used to store the snapshot. An archive may be used for data that is infrequently accessed (i.e., cold data). An archive may be used for data for which a loading penalty due to the need to retrieve the data from an archive will not hurt the performance of a system. An archive policy may indicate that the file system data is to be archived to a remote storage system, such as a cloud storage system or a cluster storage system. In some embodiments, the archive policy may indicate that a full snapshot archive of the file system data and/or an incremental snapshot archive of the file system data is to be performed. A full snapshot archive is an archive of a full snapshot. It includes all the nodes of a snapshot tree without referring back to the node of a previous snapshot tree. An incremental snapshot archive is an archive of an incremental snapshot. It includes the nodes that represent the difference between a snapshot and a previous snapshot and one or more references to one or more nodes associated with one or more previous snapshots.

A snapshot archive may include file system data and serialized snapshot tree data. File system data includes one or more data chunks that make up data of a file system. In some embodiments, a version of file system data is comprised of one or more blocks that are segmented into one or more chunks of data, a chunk identifier is computed for each chunk of data, and the chunk identifiers are stored as file system metadata. The leaf nodes of a snapshot tree may store the file system metadata. In addition to archiving the file system data, a corresponding serialized snapshot tree data is archived to the cloud storage system or the cluster storage system. A serialized snapshot tree data stores the structure of the snapshot tree associated with the file system data as a flat set of data that is comprised of one or more blocks. Each block of the flat set of data corresponds to a node of the snapshot tree. The blocks that correspond to an intermediate node or a root node may include a file offset to another block of the serialized snapshot tree data or a file offset to another block of a different serialized snapshot tree data. A block that corresponds to a leaf node may include a file offset to a portion of the archived file system data.

A request for data at a particular time may be received from a user. In some instances, the snapshots associated with the data at the particular time may not be stored locally and the archived version of the snapshot may be retrieved to determine the data at the particular time. Instead of starting with the last full snapshot and adding one or more incremental snapshots to the last full snapshot to determine the value of the data at the particular time, a view of the file system data at the particular time may be determined by retrieving the serialized snapshot tree data associated with the particular time and deserializing the serialized snapshot tree data associated with the particular time. In some embodiments, one or more additional associated serialized snapshot tree data sets may be retrieved to determine the data at the particular time. The generated view reproduces a portion of or the entire tree data structure at the particular time. The requested data may be determined based on the view, retrieved from remote storage, and provided to the user.

FIG. 1 is a block diagram illustrating an embodiment of a distributed storage system. In the example shown, system 100 includes primary storage system 102, secondary storage 104, cloud storage 106, and one or more clusters 108.

Primary storage system 102 is a computing system that stores file system data. Primary storage system 102 may be comprised of one or more servers, one or more computing devices, one or more storage devices, and/or a combination thereof. Primary storage system 102 may be configured to backup file system data to secondary storage system 104 according to one or more backup policies. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary storage system 102.

Secondary storage system 104 is a storage system configured to backup file system data received from primary storage system 102. Secondary storage system 104 may protect a large volume of applications while supporting tight business requirements (recovery time objective (RTO) and recovery point objective (RPO)). Secondary storage system 104 may unify end-to-end protection infrastructure including target storage, providing backup, replicating data, disaster recover, and/or cloud tiering. Secondary storage system 104 may provide scale-out, globally deduped, highly available storage to consolidate all secondary data, including backups, files, and test/dev copies. Secondary storage system 104 simplifies backup infrastructure and eliminates the need to run separate backup software, proxies, media servers, and archival. Secondary storage system 104 may be fully integrated with a virtual machine (VM) centralized management tool, such as vCenter, and an applications programming interface (API) for data protection. Secondary storage system 104 may reduce the amount of time to perform RPOs and support instantaneous RTOs by creating a clone of a backup VM and running the VM directly from secondary storage system 104. Secondary storage system 104 may integrate natively with one or more cloud servers. This eliminates the need to use tape archives by using one or more cloud servers for long-term data archival.

Secondary storage system 104 may be configured to implement policy-based archival of older snapshots on-prem to cloud storage for long-term retention. The cloud archive allows data to be indexed for fast search and retrieval back to on-prem from the cloud. The cloud archive allows recovery of data to a different site in the event the primary cluster fails. The cloud archive may allow data encryption in-flight and at-rest in the cloud. Secondary storage system 104 may be configured to archive a copy of the file system data in a remote storage for disaster recovery. Secondary storage system 104 may be configured to move certain file system data to a remote storage location, such as cloud storage 106, to handle spikes in storage demand. Secondary storage system 104 may be configured to implement a policy-based waterfall model that moves cold data to a remote storage location, such as cloud storage 106. Upon receiving a read for data that is stored at the remote storage location, secondary storage system 104 is configured to retrieve the data and store the data at the secondary storage location.

Secondary storage system 104 is configured to store the file system data in a tree data structure and to create a snapshot of the tree data structure. The snapshot may be associated with a view at a particular moment in time. A view depicts the connections between nodes and the data stored in one or more leaf nodes at the particular moment in time. The tree data structure allows a chain of snapshot trees to be linked together. Each time a snapshot is performed, a root node of the snapshot tree may be linked to one or more intermediate nodes associated with a previous snapshot tree. Secondary storage system 104 may archive the file system data to cloud storage system 106 or to a cluster storage system 108. The archive may include the file system data and a serialized snapshot tree data that is a serialized version of the tree data structure at the particular moment in time. In some embodiments, the archive includes a full snapshot archive of the file system data. In other embodiments, the archive includes an incremental snapshot archive of the file system data.

In some embodiments, a backup policy may indicate that one or more previous snapshots are to be deleted after a full snapshot is performed.

Secondary storage system 104 may be configured to archive any of the data stored on secondary storage system 104 (e.g., tree data, other non-tree data) according to one or more archive policies. In some embodiments, an archive policy indicates that the data is to be archived to a cloud storage system and/or to a cluster storage system on a periodic basis (e.g., hourly, daily, weekly, monthly, etc.). In other embodiments, an archive policy indicates that data is to be archived to a cloud storage system and/or to a cluster storage system when a threshold size of data has changed. In other embodiments, an archive policy indicates that data is to be archived to a cloud storage system and/or to a cluster storage system upon a command from a user associated with secondary storage system 104.

Secondary storage system 104 may be comprised of one or more solid state drives, one or more hard disk drives, or a combination thereof. Secondary storage system 104 may include one or more processors coupled to the storage drives and configured to archive data stored in the storage drives to cloud storage system 106, a cluster 108, and/or one or more other storage mediums (e.g., tape, removable storage). In one embodiment, secondary storage system 104 is comprised of one solid state drive and three hard disk drives.

Secondary storage system 104 may include a file system manager 105. File system manager 105 is configured to maintain file system data in the form of nodes arranged in a tree data structure. In some embodiments, leaf nodes in the file system tree include key-value pairs that associate data keys with values in the form of particular items of file system data. A user requests a particular item of data by providing a data key to file system manager 105, which traverses a file system tree to find the item of data associated with that data key. File system manager 105 may be configured to perform a snapshot of a snapshot tree. File system manager 105 may be configured to perform one or more modifications, as disclosed herein, to a snapshot tree.

Cloud storage system 106 may be a public cloud storage provider (e.g., Amazon Web Services, Microsoft Azure Blob Storage, Google Cloud Storage). Cloud storage system 106 is configured to receive and store an archive from secondary storage system 104. Cloud storage system 106 may store a full snapshot of file system data and associated serialized snapshot tree data. Cloud storage system 106 may store an incremental snapshot of file system data and associated serialized snapshot tree data. Cloud storage system 106 may provide to secondary storage 104 file system data and a serialized snapshot tree data associated with a particular time.

One or more clusters 108 may be comprised of a plurality of storage nodes. The storage nodes may be comprised of one or more solid state drives, one or more hard disk drives, or a combination thereof. A cluster is configured to receive and store an archive from secondary storage system 104. A cluster may store a full snapshot of file system data and associated serialized snapshot tree data. A cluster may store an incremental snapshot of file system data and associated serialized snapshot tree data. A cluster may provide to secondary storage 104 file system data and a serialized snapshot tree data associated with a particular time. In some embodiments, one or more clusters 108 may be part of secondary storage 104.

Figure 2A:
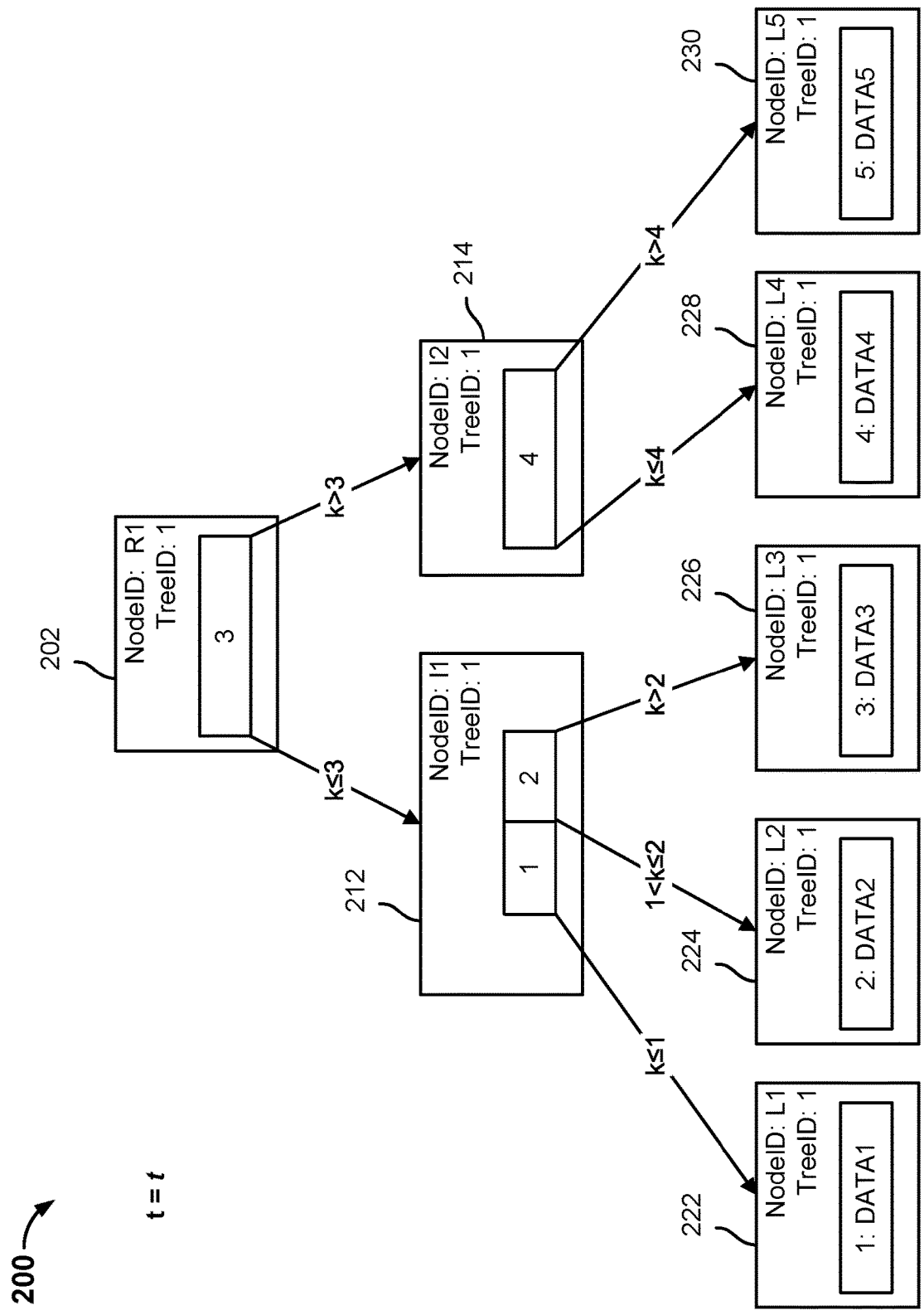
FIG. 2A is a block diagram illustrating an embodiment of a snapshot tree storing file system data.

FIG. 2A is a block diagram illustrating an embodiment of a tree data structure storing file system data. In the example shown, tree data structure 200 may be created by a storage system, such as secondary storage system 104. In the example shown, tree data structure 200 is a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, and 230, there could be any number of intermediate levels in a snapshot tree. Tree data structure 200 may be a snapshot tree of file system data at a particular point in time t. Tree data structure 200 may correspond to a version of a snapshot tree. Root node 202 is associated with the snapshot of the file system data at the particular point in time t. In some embodiments, the file system data is metadata for a distributed file system and may include information such as file size, directory structure, file permissions, physical storage locations of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree. A leaf node may store key-value pairs of file system data. A data key k is a lookup value by which a particular leaf node may be accessed. For example, "1" is a data key that may be used to lookup "DATA1" of leaf node 222. Examples of values stored by a leaf node include, but are not limited to, file size, directory structure, file permissions, physical storage locations of the files, etc. A leaf node may store a data key k and a pointer to a location that stores the value associated with the data key.

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical data key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age," etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the snapshot/view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing snapshot tree 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 214 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230.

Figure 2B:
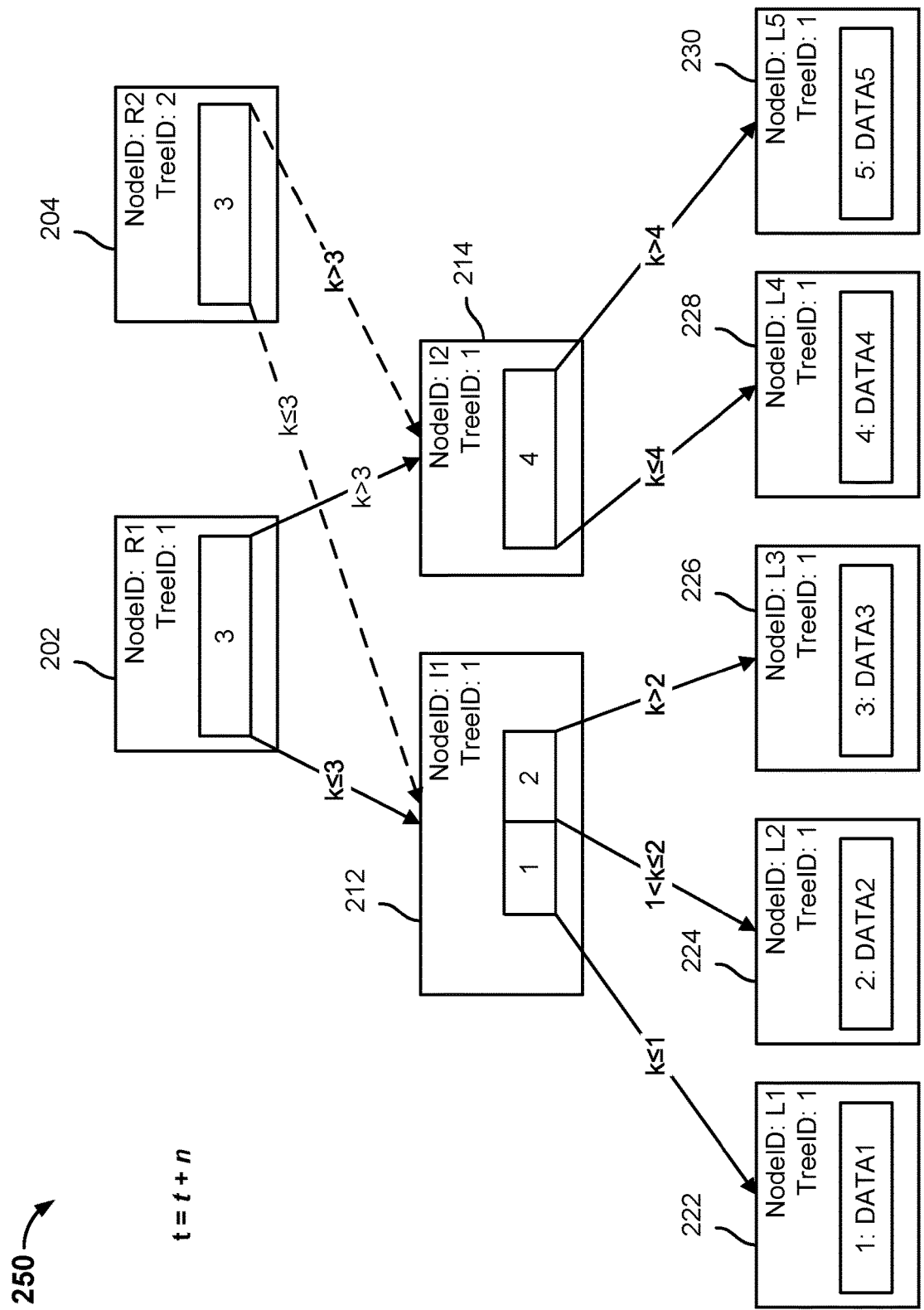
FIG. 2B is a block diagram illustrating an embodiment of cloning a snapshot tree.

FIG. 2B is a block diagram illustrating an embodiment of cloning a snapshot tree of a tree data structure. In some embodiments, tree data structure 250 may be created by a storage system, such as secondary storage system 104. In the example shown, snapshot tree 250 includes a snapshot tree that is comprised of root node 204, intermediate nodes 212, 214, and leaf nodes 222, 224, 226, 228, and 230. Tree data structure 250 may be a snapshot of file system data at a particular point in time t+n. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t+n is linked to the snapshot tree at time t. To create a snapshot tree of the file system data at time t+n, a copy of the previous root node is created. The root node copy includes the same set of pointers as the original node. However, the root node copy also includes a different NodeID and a different TreeID. The TreeID is the identifier associated with a view. Root node 204 is associated with the snapshot of the file system data at the particular point in time t+n. Root node 202 is associated with the snapshot of the file system data at the particular point in time t. The snapshot tree at time t+n may correspond to a version of a snapshot tree. In some embodiments, the snapshot tree at time t+n is a current view of the file system metadata. A current view may still accept one or more changes to the data. The TreeID of a root node indicates a snapshot with which the root node is associated. For example, root node 202 with a TreeID of "1" is associated with a first snapshot and root node 204 with a TreeID of "2" is associated with a second snapshot. In other embodiments, the snapshot tree at time t+n is a snapshot view of the file system metadata. A snapshot view may not accept any changes to the data.

In some embodiments, to create a snapshot of the file system at time t+n, two root node copies are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot is deleted after a snapshot is performed, i.e., root node 202 is deleted after root node 204 is created.

In the example shown, root node 204 is a copy of root node 202. Similar to root node 202, root node 204 includes the same pointers as root node 202, except that root node 204 includes a different node identifier and a different view identifier. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the snapshot with which the node is associated.

Figure 2C:
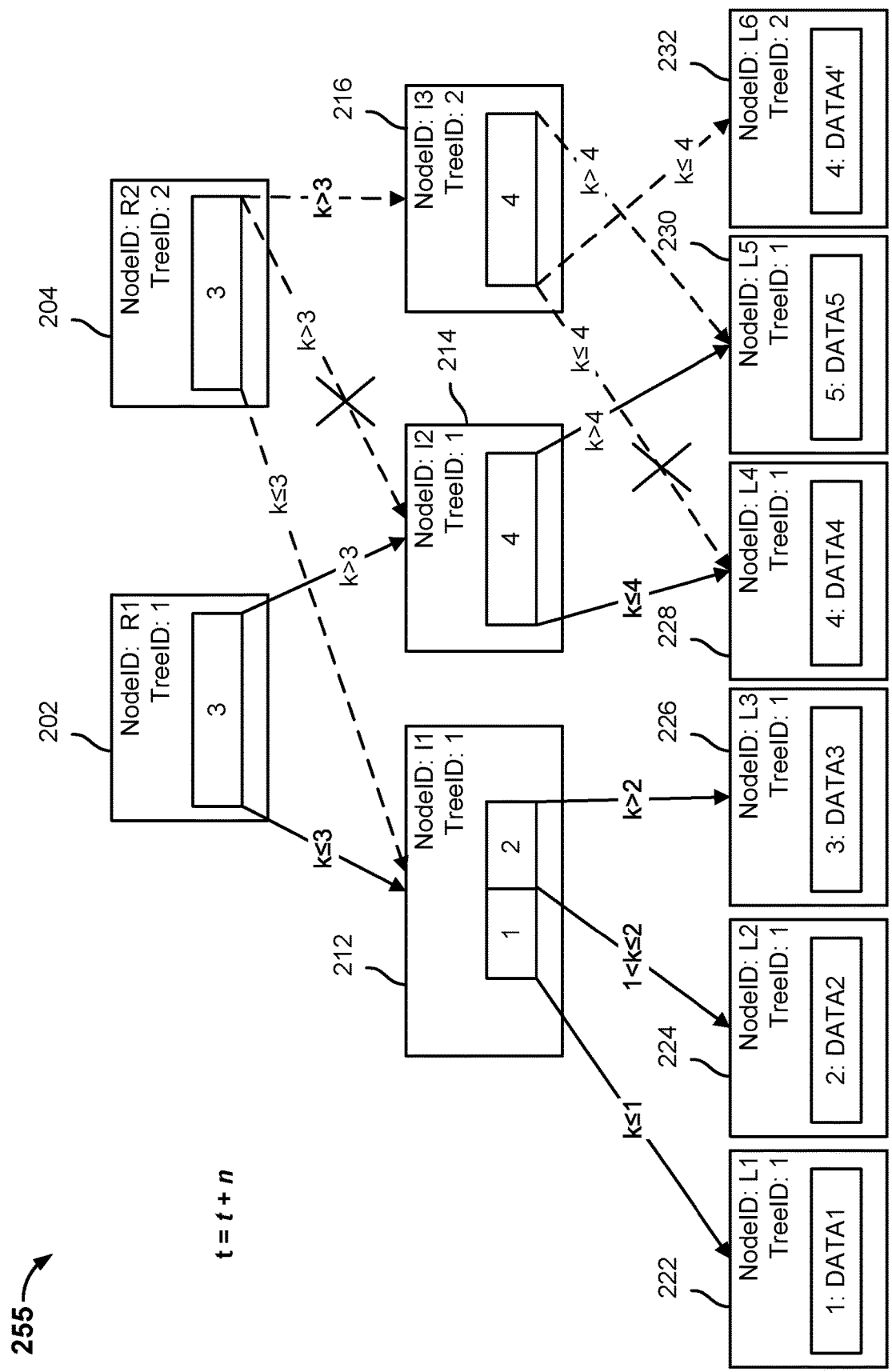
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 105. Tree data structure 255 may be a current view of the file system data at time t+n. A current view may still accept one or more changes to the data. Because a snapshot represents a perspective of the file system metadata that is "frozen" in time, one or more copies of one or more nodes affected by a change to file system metadata are made. Tree data structure 255 may include a root node that corresponds to a version of a snapshot tree.

In the example shown, the value "DATA4" has been modified to be "DATA4'." At time t+n, the file system manager starts at root node 204 because that is the root node associated with snapshot tree at time t+n. The value "DATA4" is associated with the data key "4." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204 (the identifier associated with a snapshot at time t=t+n), determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a set of pointers of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

Figure 2D:
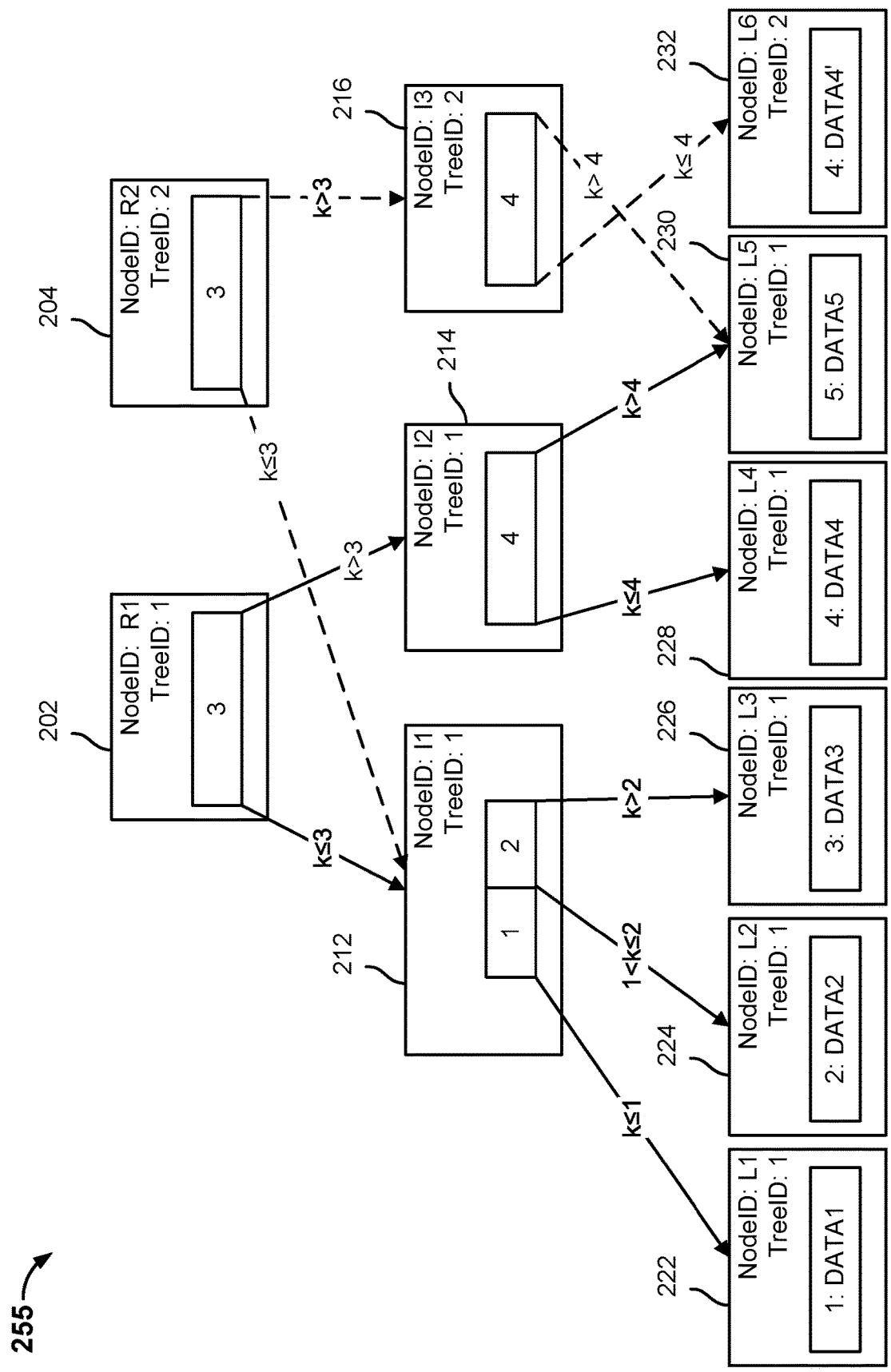
FIG. 2D is a block diagram illustrating an embodiment of a modified snapshot tree.

FIG. 2D is a block diagram illustrating an embodiment of a modified snapshot tree of a tree data structure. The tree data structure 255 shown in FIG. 2D illustrates a result of the modifications made to tree data structure 255 as described with respect to FIG. 2C.

Figure 2E:
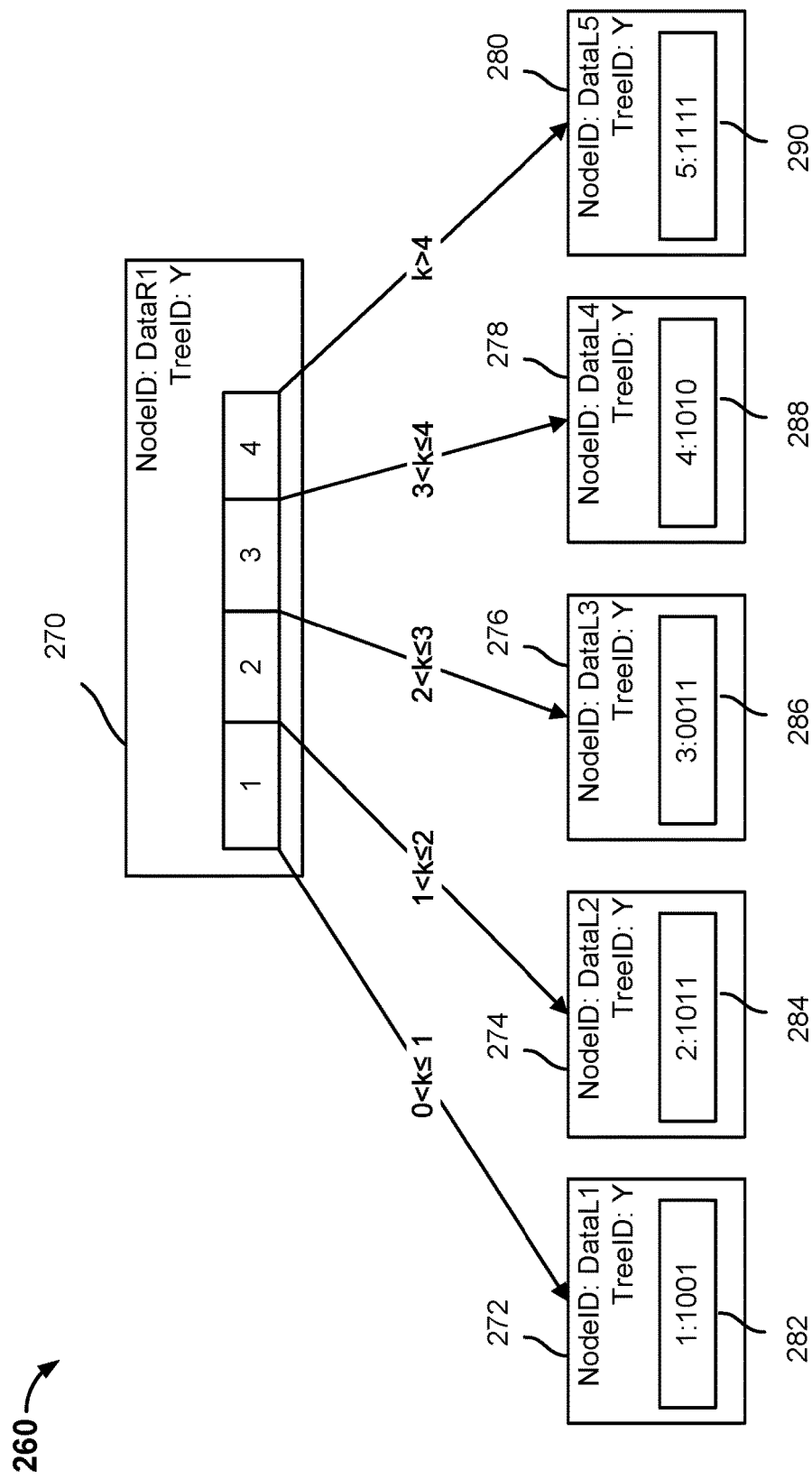
FIG. 2E is a block diagram illustrating an embodiment of leaf node data.

FIG. 2E is a block diagram illustrating an embodiment of leaf node data. In the example shown, leaf node 260 may be leaf node 222, 224, 226, 228, 230. A tree data structure may be used to store data related to a value associated with a leaf node. In some embodiments, a leaf node, such as leaf node 222, 224, 226, 228, 230, may include a pointer to a tree data structure, such as the tree data structure depicted in FIG. 2E.

In the example shown, leaf node 260 includes a data root node 270 and data leaf nodes 272, 274, 276, 278, and 280. A leaf node may include one or more intermediate nodes, similar to the tree data structure depicted in FIG. 2A. Data root node 270 includes a NodeID and a TreeID. Data root node 270 also includes a set of node keys. Data root node 270 includes a first node key of "1," a second node key of "2," a third node key of "3," and a fourth node key of "4." The data key k for data leaf node 272 is a value that is less than or equal to the first node key. Data leaf node 272 includes a data block 282 that stores bits of ones and zeros. Although data block 282 is depicted as storing the bit pattern "1001," a data block may store any bit pattern. Data leaf node 272 may include a pointer to a physical location that stores the data.

The data key k for data leaf node 274 is a value that is greater than the first node key and less than or equal to the second node key. Data leaf node 274 includes a data block 284 that stores bits of ones and zeros. Although data block 284 is depicted as storing the bit pattern "1011," a data block may store any bit pattern. Data leaf node 274 may include a pointer to a physical location that stores the data.

The data key k for data leaf node 276 is a value that is greater than the second node key and less than or equal to the third node key. Data leaf node 276 includes a data block 286 that stores bits of ones and zeros. Although data block 286 is depicted as storing the bit pattern "0011," a data block may store any bit pattern. Data leaf node 276 may include a pointer to a physical location that stores the data.

The data key k for data leaf node 278 is a value that is greater than the third node key and less than or equal to the fourth node key. Data leaf node 278 includes a data block 288 that stores bits of ones and zeros. Although data block 288 is depicted as storing the bit pattern "1010," a data block may store any bit pattern. Data leaf node 278 may include a pointer to a physical location that stores the data.

The data key k for data leaf node 280 is a value that is greater than the fourth node key. Data leaf node 280 includes a data block 290 that stores bits of ones and zeros. Although data block 290 is depicted as storing the bit pattern "1111," a data block may store any bit pattern. Data leaf node 280 may include a pointer to a physical location that stores the data.

Figure 3A:
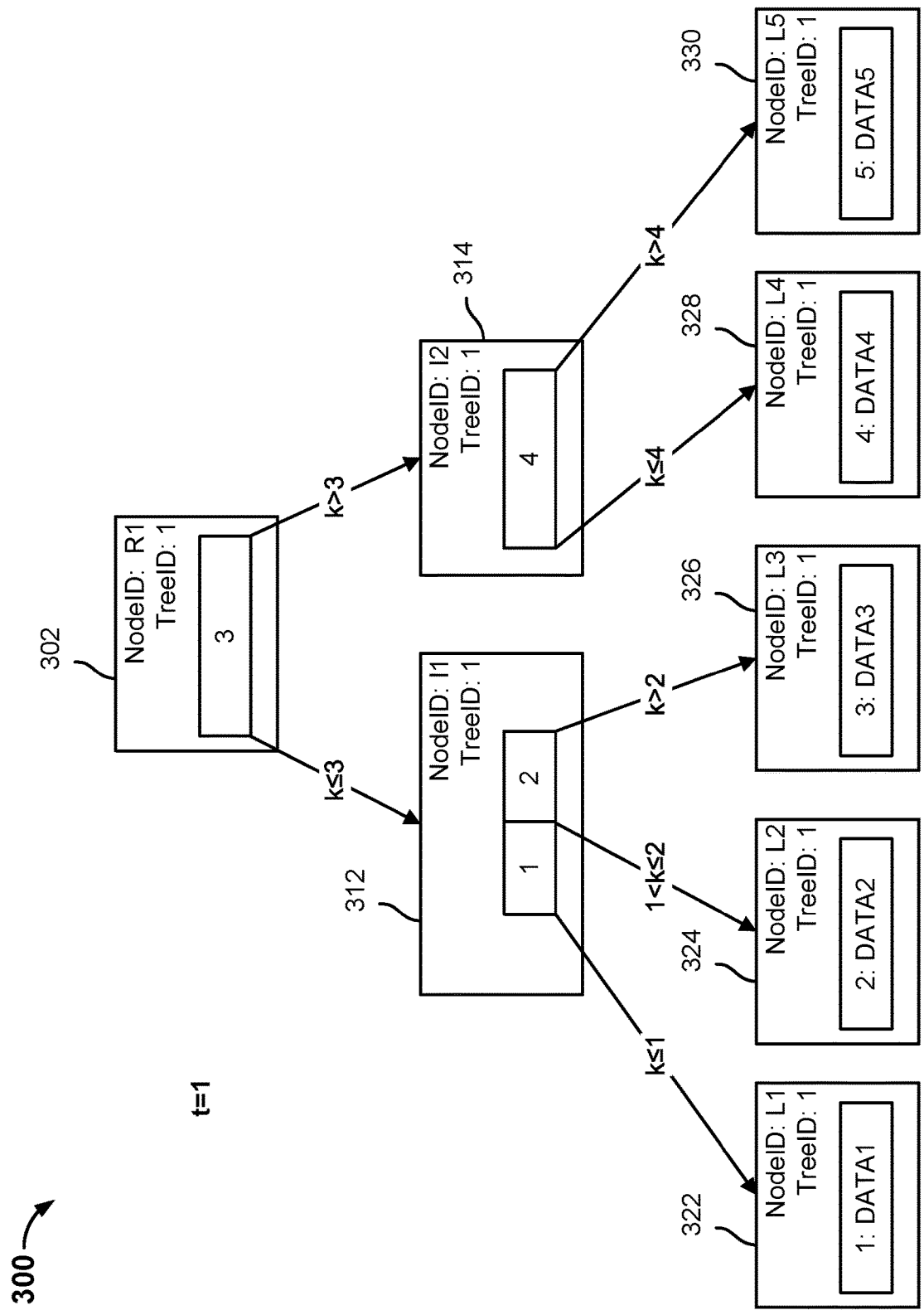
FIG. 3A is a block diagram illustrating an embodiment of a snapshot tree at a particular moment in time.

FIG. 3A is a block diagram illustrating an embodiment of a tree data structure at a particular moment in time. In the example shown, tree data structure 300 is a snapshot tree at time t=1. At t=1, tree data structure 300 includes a root node 302, intermediate nodes 312, 314, and leaf nodes 322, 324, 326, 328, 330. At t=1, tree data structure 300 is similar to the tree data structure 200 shown in FIG. 2A. Tree data structure 300 may correspond to a version of a snapshot tree.

A full snapshot or an incremental snapshot of the snapshot tree at time t=1 may be performed and stored on the storage system. The full snapshot may provide a complete view of the tree data structure at a particular point in time, that is, the full snapshot stores all of the nodes associated with a snapshot at the particular moment in time. For example, a full snapshot at time t=1 would include root node 302, intermediate nodes 312, 314, leaf nodes 322, 324, 326, 328, and 330. An incremental snapshot may provide a partial view of the tree data structure at a particular time. However, in this instance, an incremental snapshot at time t=1 would also include root node 302, intermediate nodes 312, 314, leaf nodes 322, 324, 326, 328, and 330 because those nodes have not been previously stored.

Figure 3B:
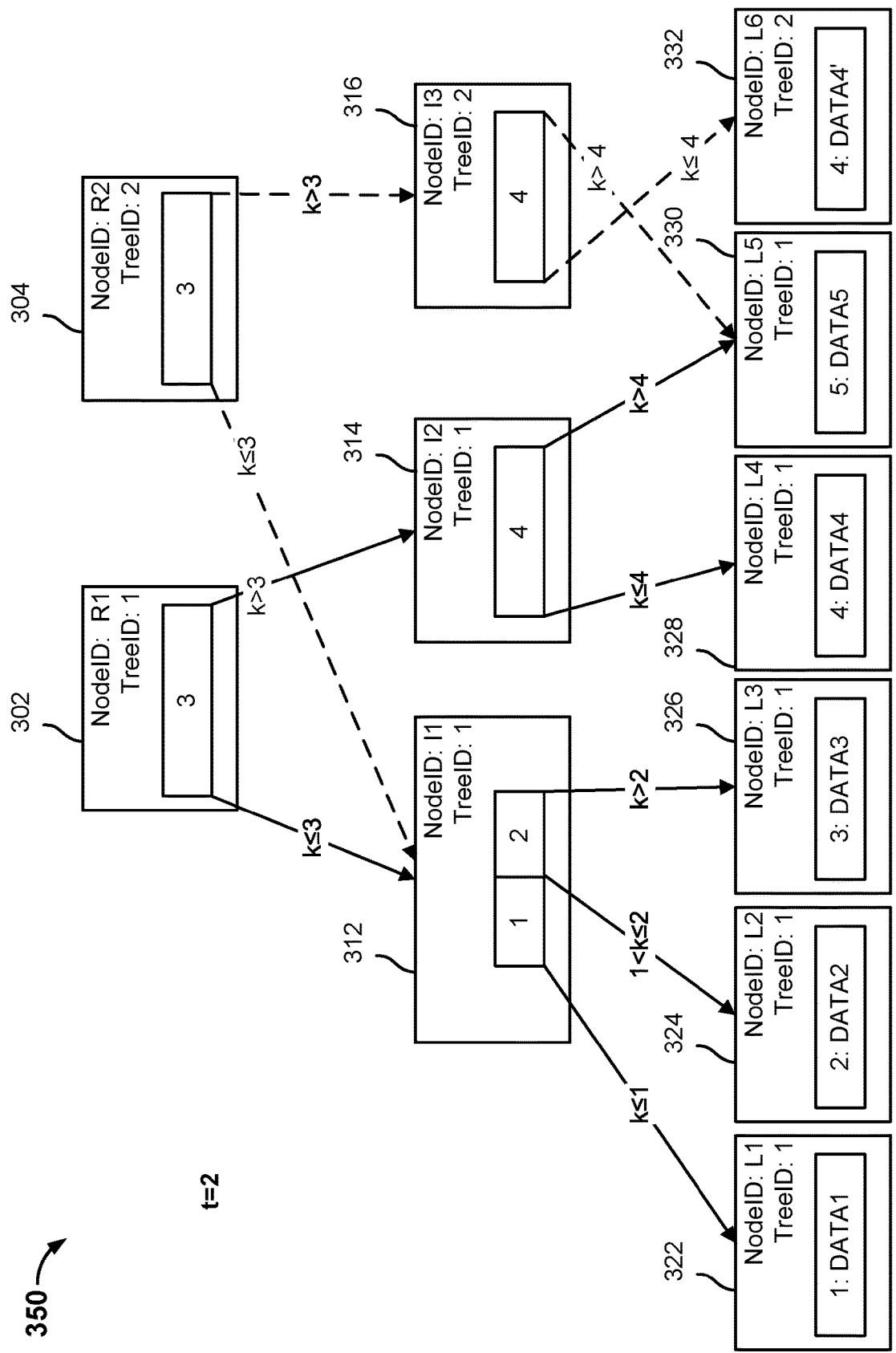
FIG. 3B is a block diagram illustrating an embodiment of a snapshot tree at a particular moment in time.

FIG. 3B is a block diagram illustrating an embodiment of a tree data structure at a particular moment in time. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=2 is linked to the snapshot tree at time t=1. At t=2, the snapshot tree includes root node 304, intermediate nodes 312, 316, and leaf nodes 322, 324, 326, 330, 332. Root node 302 is associated with a snapshot at time t=1 and root node 304 is associated with a snapshot at time t=2. At t=2, the tree data structure 350 is similar to the tree data structure 255 shown in FIG. 2D. The snapshot tree at time t=2 is a modified version of snapshot tree at time t=1 (i.e., the value of "DATA4" has been modified to be "DATA4'"). The snapshot at t=2 may correspond to a version of a snapshot tree.

A full snapshot or an incremental snapshot of the snapshot tree at t=2 may be performed and stored on the storage system. The full snapshot may provide a complete view of the tree data structure at a particular point in time, that is, the full snapshot stores all of the nodes associated with a snapshot tree at the particular moment in time. For example, a full snapshot at time t=2 would include root node 304, intermediate nodes 312, 316, leaf nodes 322, 324, 326, 330, 332, but would not include root node 302, intermediate node 314, and leaf node 328 because those nodes are not associated with the snapshot at time t=2, i.e., a node of a snapshot at time t=2 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=2 would include root node 304, intermediate node 316, and leaf node 332, but in contrast to the full snapshot at t=1, would not include intermediate node 312 and leaf nodes 322, 324, 326, and 330 because those nodes were previously stored at time t=1.

Figure 3C:
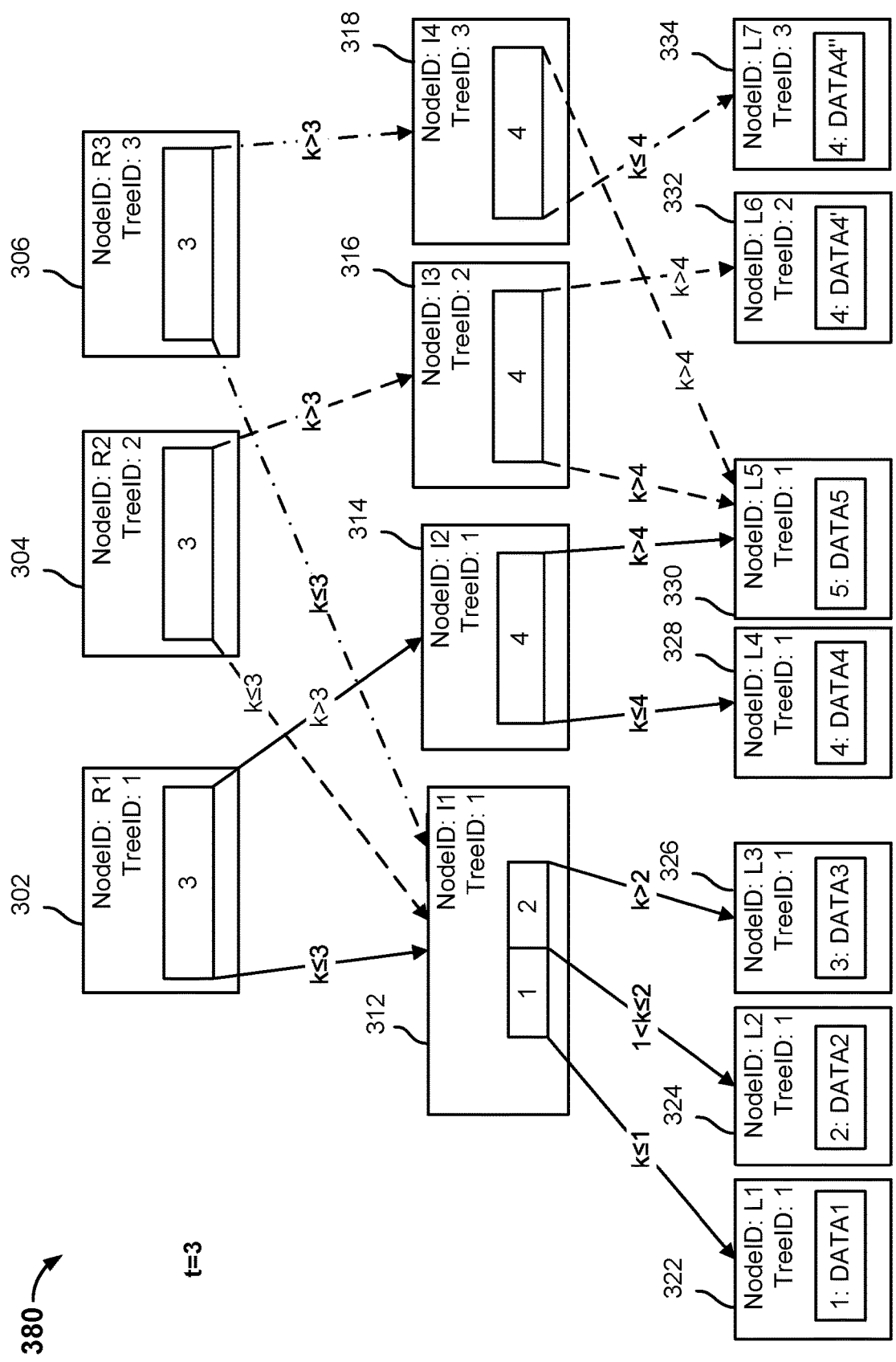
FIG. 3C is a block diagram illustrating an embodiment of a snapshot tree at a particular moment in time.

FIG. 3C is a block diagram illustrating an embodiment of a tree data structure at a particular moment in time. In the example shown, tree data structure 380 includes a snapshot tree at time t=3. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at t=3 is linked to the snapshot trees at t=1, 2. At t=3, the snapshot tree includes root nodes 306, intermediate nodes 312, 318, and leaf nodes 322, 324, 326, 330, 334. Root node 302 is associated with a snapshot at time t=1, root node 304 is associated with a snapshot at time t=2, and root node 306 is associated with a snapshot at time t=3. Snapshot tree 380 is a modified version of the snapshot at t=2 (i.e., the value of "DATA4'" has been modified to be "DATA4''"). The snapshot tree at t=3 may correspond to a version of a snapshot tree.

A full snapshot or an incremental snapshot of the snapshot tree at t=3 may be performed and stored on the storage system. The full snapshot may provide a complete view of the tree data structure at a particular point in time, that is, the full snapshot stores all of the nodes associated with a snapshot at the particular moment in time. For example, a full snapshot at time t=3 would include root node 306, intermediate nodes 312, 318, leaf nodes 322, 324, 326, 330, 334, but would not include root nodes 302, 304, intermediate nodes 314, 316 and leaf nodes 328, 332 because those nodes are not associated with the snapshot at time t=3, i.e., a node of a snapshot at time t=3 does not include a pointer to any of those nodes. An incremental snapshot may provide a partial view of the tree data structure at a particular time. The incremental snapshot may store each of the nodes associated with the snapshot tree at the particular moment in time that have not been previously stored. For example, an incremental snapshot at time t=3 would include root node 306, intermediate node 318, and leaf node 334, but in contrast to the full snapshot at t=3, would not include intermediate node 312 and leaf nodes 322, 324, 326, and 330 because those nodes were previously stored at time t=1.

Figure 3D:
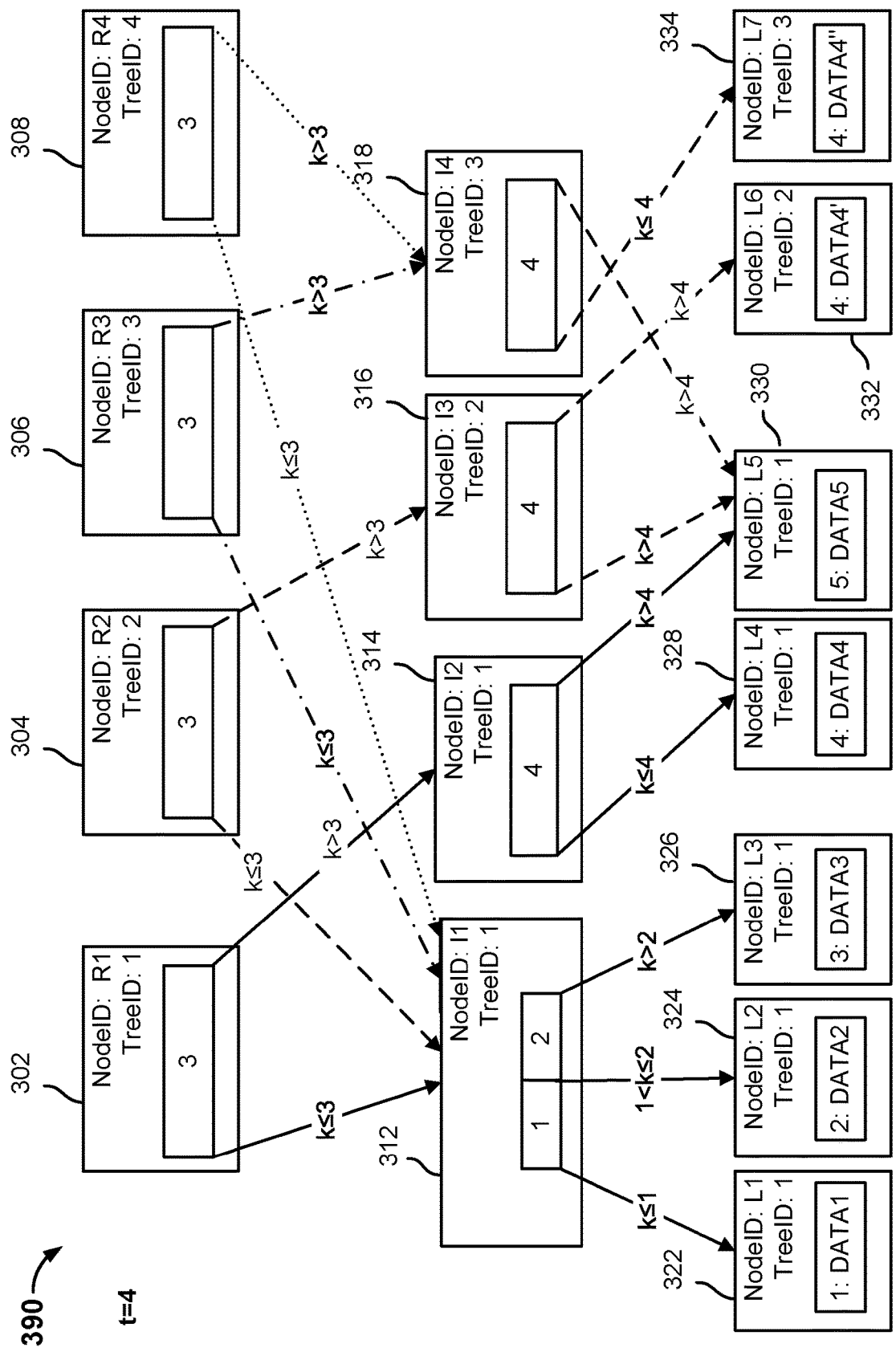
FIG. 3D is a block diagram illustrating an embodiment of a snapshot tree at a particular moment in time.

FIG. 3D is a block diagram illustrating an embodiment of a tree data structure at a particular moment in time. In the example shown, tree data structure 390 includes a snapshot tree at time t=4. The tree data structure allows a chain of snapshot trees to be linked together. Each time a snapshot is performed, a root node of the snapshot tree may be linked to one or more intermediate nodes associated with a previous snapshot tree. In the example shown, the snapshot tree at time t=4 is linked to the snapshot trees at times t=1, 2, 3. At t=4, the snapshot tree includes root node 308, intermediate nodes 312, 318, and leaf nodes 322, 324, 326, 330, 334. Root node 302 is associated with a snapshot at time t=1, root node 304 is associated with a snapshot at time t=2, root node 306 is associated with a snapshot at time t=3, and root node 308 is associated with a snapshot at time t=4. The snapshot tree at time t=4 may correspond to a version of a snapshot tree.

A full snapshot or an incremental snapshot of the snapshot tree at time t=4 may be performed and stored on the storage system. The full snapshot may provide a complete view of the tree data structure at a particular point in time, that is, the full snapshot stores all of the nodes associated with a snapshot at the particular moment in time. For example, a full snapshot at time t=4 would include root node 308, intermediate nodes 312, 318, leaf nodes 322, 324, 326, 330, 334, but would not include root nodes 302, 304, 306 intermediate nodes 314, 316 and leaf nodes 328, 332 because those nodes are not associated with the snapshot at time t=4, i.e., a node of a snapshot at time t=4 does not include a pointer to any of those nodes. An incremental snapshot may provide a partial view of the tree data structure at a particular time. The incremental snapshot may store each of the nodes associated with the snapshot tree at a particular moment in time that has not been previously stored. For example, an incremental snapshot at time t=4 would include root node 308, but in contrast to the full snapshot at t=4, would not include intermediate nodes 312, 318 and leaf nodes 322, 324, 326, 330, 334 because those nodes were previously stored at time t=1 or t=3.

As seen in FIGS. 3B-3D, each snapshot tree builds off of a previous snapshot tree, that is, a chain of snapshot trees exists. Each snapshot tree is associated with a snapshot of the file system data. As more and more snapshots are created and linked, this may require a lot of storage to store the snapshots. To reduce the amount of storage needed to store the snapshots, a policy may indicate that after a full snapshot is performed at a particular point in time, one or more previous snapshots may be deleted from the storage system. In some embodiments, the one or more previous snapshots are deleted after a condition of a retention time policy has passed.

Figure 4A:
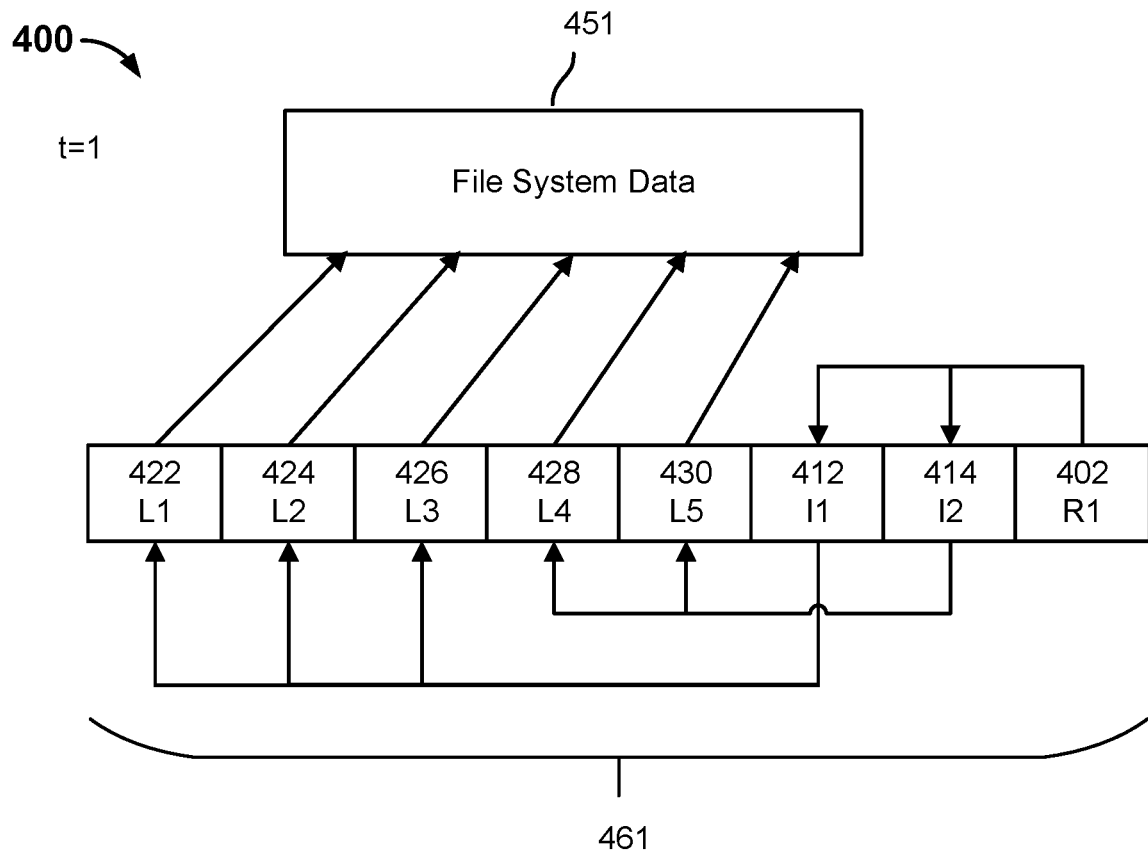
FIG. 4A is a block diagram illustrating an embodiment of archive data.

FIG. 4A is a block diagram illustrating an embodiment of archive data. A snapshot is the state of a system at a particular moment in time. A snapshot may be stored locally at a storage system, such as secondary storage system 104. A snapshot allows the state of a system to be rolled back to a moment in time for which a snapshot is stored. A system may store a large number of snapshots (e.g., thousands, millions). Each snapshot may require a significant amount of storage (e.g., GBs, TBs, PBs, etc.). In some instances, it may be desirable to archive a snapshot to a remote storage location, such as cloud storage 106 or cluster storage 108. For example, one or more older snapshots may be archived to a remote storage location for long-term retention. One or more snapshots may be archived to a remote storage location for data recovery purposes (e.g., other storage systems may access the data associated with a snapshot in the event a storage location that locally stores the snapshot goes offline). One or more snapshots may be archived to a remote storage location to handle spikes in storage demand. One or more snapshots that include cold data (i.e., data that is not accessed frequently) may be archived to a remote storage location to free up local storage for one or more snapshots that include hot data (i.e., data that is accessed frequently).

The file system data associated with a snapshot may be archived to a remote storage location. An archive policy may indicate that a full snapshot archive of a snapshot or an incremental snapshot archive of the snapshot is to be performed and stored on a remote storage location. A full snapshot archive includes a complete view of one version of a snapshot tree at a particular moment in time. A full snapshot archive includes a root node associated with the view at the particular moment in time and any intermediate nodes and/or leaf nodes associated with the root node. A full snapshot archive does not include a node of a previous version of the snapshot tree if the node is not pointed to a node associated with the view at the particular moment in time. A full snapshot archive is similar to a full snapshot, except that the data associated with a full snapshot is stored at a remote location instead of on the storage system; that is the full snapshot archive includes the data stored in each of the nodes associated with the snapshot tree at the particular moment in time. For example, a full snapshot archive associated with a snapshot at t=3, as depicted in FIG. 3C, includes root node 306, intermediate nodes 312, 318, and leaf nodes 322, 324, 326, 330, and 334.

An incremental snapshot archive includes a partial view of one version of a snapshot tree at a particular moment in time. An incremental snapshot archive includes a representation of what was not previously archived. An incremental snapshot archive is similar to an incremental snapshot, except that the data associated with the incremental snapshot archive is stored at a remote location instead of on the storage system; that is, the incremental snapshot archive includes the data stored in the leaf nodes of the snapshot tree that has not been previously archived. For example, an incremental snapshot archive associated with a snapshot at t=3, as depicted in FIG. 3C, includes root node 306, intermediate node 318, and leaf node 334. The incremental snapshot archive at t=3 does not include root nodes 302, 304, intermediates intermediate nodes 312, 314, 316, or leaf nodes 322, 324, 326, 328, 330, 332 because those nodes were previously archived.

Figure 4B:
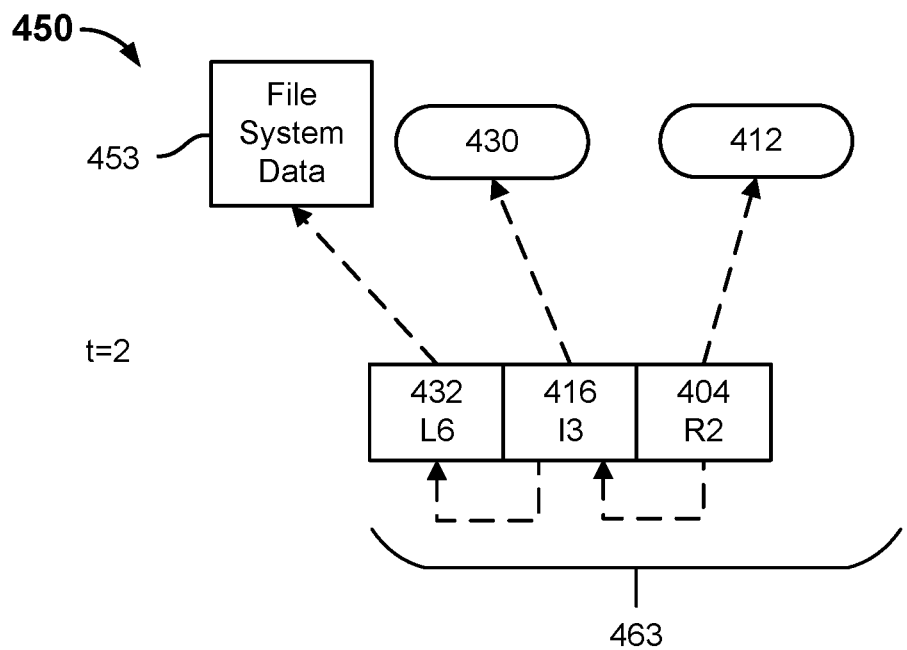
FIG. 4B is a block diagram illustrating an embodiment of archive data.
Figure 4C:
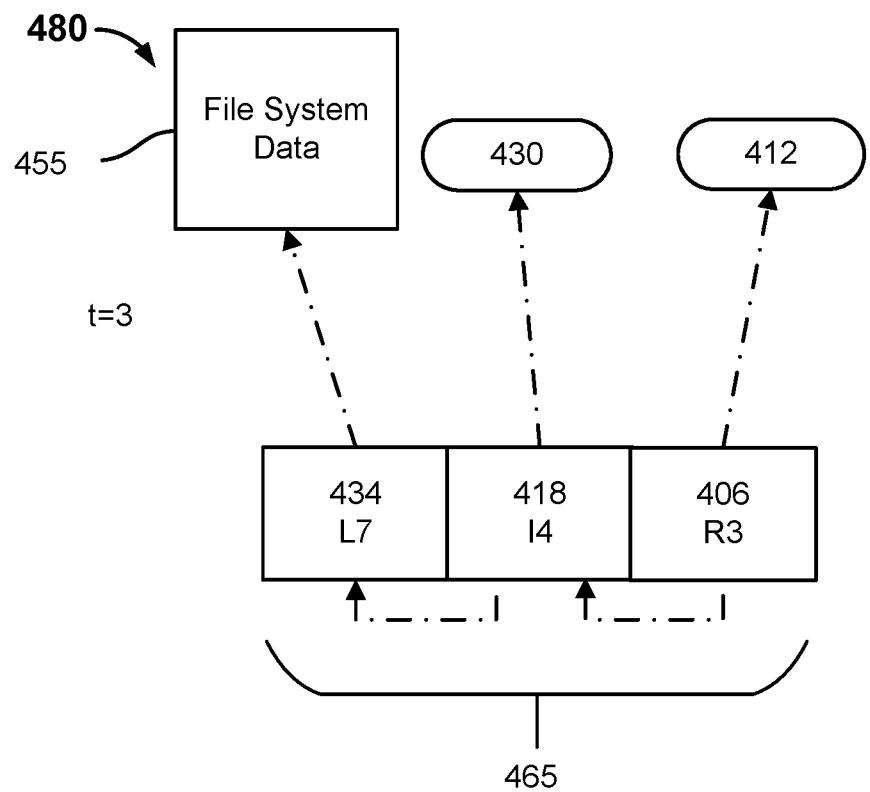
FIG. 4C is a block diagram illustrating an embodiment of archive data.
Figure 4D:
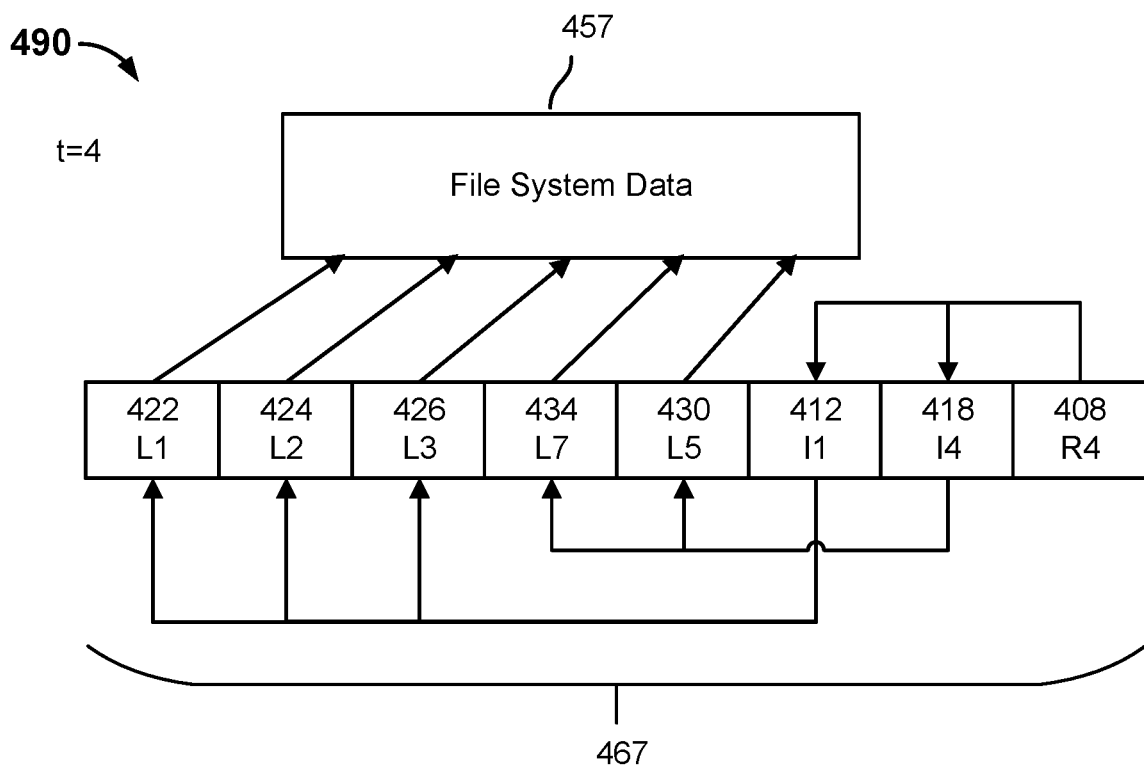
FIG. 4D is a block diagram illustrating an embodiment of archive data.

A full snapshot archive may be performed based on one or more policies associated with a backup storage system. For example, a full snapshot archive may be performed on a periodic basis (e.g., every X day(s), every Y week(s), every Z month(s), etc.), upon a threshold size of bytes changing from the previous full snapshot, after a threshold number of incremental snapshot archives have been performed, etc. A policy may indicate that an incremental snapshot archive is to be performed on a more frequent basis than a full snapshot archive. The full snapshot archive and incremental snapshot archives are associated with a snapshot at a particular moment in time. For example, archive data 400 is associated with the snapshot tree at time t=1, archive data 450 is associated with the snapshot tree at time t=2, and archive data 480 is associated with the snapshot tree at time t=3. As seen in FIGS. 4A-4C, each snapshot archive builds off of a previous snapshot archive, that is, a block of serialized data includes a file offset to a block associated with previously serialized data. As more and more archives are created, this may require a lot of storage to store the archives. To reduce the amount of storage needed to store the archives, a policy may indicate that after a full snapshot archive, such as depicted in FIG. 4D, is performed at a particular point in time, one or more previous snapshot archives (i.e., archives 400, 450, 480) may be deleted from the remote storage location. In some embodiments, the one or more previous snapshot archives are deleted after a condition of retention time policy has passed.

In the example shown, archive data 400 can be archived by a storage system, such as secondary storage system 104, to a remote storage location, such as cloud storage 106 or cluster storage 108. In the example shown, archive data 400 includes file system data 451 and a serialized snapshot tree data 461. In the example shown, archive data 400 is a file representation of a snapshot of the snapshot tree at a particular moment in time, t=1. Archive data 400 stores a full snapshot of the snapshot tree at time t=1. A full snapshot archive includes a complete view of the nodes of a snapshot of the snapshot tree at a particular moment in time (i.e., all nodes associated with a root node of the snapshot tree) and the data stored in each of the leaf nodes of the snapshot tree. A full snapshot archive is independent on its own and does not refer back to one or more previous snapshot archives.

File system data of archive data that stores a full snapshot of a snapshot tree associated with a particular view includes all of the data stored in the one or more leaf nodes of a snapshot, regardless of when a leaf node was created (i.e., the snapshot may include leaf nodes associated with previous snapshots). In the example shown, file system data 451 corresponds to data stored in the leaf nodes of the snapshot tree at time t=1. Since archive data 400 includes a full snapshot of the snapshot tree at t=1, file system data 451 includes the data stored in leaf nodes 322, 324, 326, 328, and 330, that is, file system data 451 includes "DATA1," "DATA2," "DATA3," "DATA4," and "DATA5." File system data 451 may be archived from a storage system, such as a secondary storage system, to a remote storage location, such as a cloud storage system or a cluster backup system. In some embodiments, the file system data is the data (e.g., data blocks of a file, data segments of a file) for a distributed file system. File system data may be stored as a flat set of data. In some embodiments, file system data 451 stores all data blocks associated with leaf nodes of a snapshot tree. In other embodiments, file system data 451 stores all 1s and 0s of file data blocks associated with leaf nodes of a snapshot tree. In some embodiments, file system data 451 stores a plurality of file data blocks in a single block of file system data 451. In some embodiments, the file system data includes file system metadata, such as file size, directory structure, file permissions, physical storage locations of the files, etc.

A serialized snapshot tree data stores the structure of the snapshot tree associated with the file system data as a flat set of data that is comprised of one or more blocks. Each block of the flat set of data corresponds to a node of the snapshot tree. A block may contain a file offset. A file offset represents a pointer of a snapshot tree. Because some archive systems cannot store pointers, a file offset is used in place of pointers. The file offset may be to another block of the serialized snapshot tree data. The file offset may be to another block of a different serialized snapshot tree data.

In the example shown, serialized snapshot tree data 461 corresponds to a snapshot tree at time t=1. Serialized snapshot tree data 461 is comprised of a plurality of blocks. Each block corresponds to one of the snapshot tree nodes. For example, blocks 422, 424, 426, 428, 430, 412, 414, and 402 correspond to nodes 322, 324, 326, 328, 330, 312, 314, and 302, respectively, of the snapshot tree at t=1 in FIG. 3A.

Block 402 corresponds to root node 302. Because root node 302 includes pointers to intermediate nodes 312 and 314, block 402 includes file offsets to blocks 412 and 414. Blocks 412 and 414 correspond to intermediate nodes 312 and 314, respectively. Because intermediate node 312 includes pointers to leaf nodes 322, 324, and 326, block 412 includes file offsets to blocks 422, 424, and 426. The file offsets correspond to the pointers of a snapshot tree. Similarly, block 414 includes file offsets to blocks 428, 430 because intermediate node 314 includes pointers to leaf nodes 328, 330.

Blocks 422, 424, 426, 428, and 430 correspond to the leaf nodes of snapshot tree 300 and each include a corresponding file offset to one or more blocks of the file system data stored in file system data 451. For example, block 422 includes an offset to one or more blocks in file system data 451 that stores the value of L1. Similarly, blocks 424, 426, 428, 430 include corresponding offsets to one or more blocks in file system data 451 that store the value of L2, L3, L4, and L5, respectively.

FIG. 4B is a block diagram illustrating an embodiment of archive data. In the example shown, archive data 450 can be archived by a system, such as secondary storage system 104. In the example shown, archive data 450 includes file system data 453 and a serialized snapshot tree data 463.

File system data 453 is an incremental snapshot archive of the file system data stored in the one or more leaf nodes of a snapshot tree. An incremental snapshot archive may include changes to the data of a snapshot tree since a last snapshot archive (e.g., new data or modified data). For example, file system data 453 may include one or more values stored in leaf nodes of the snapshot tree at time t=2 that were not previously archived. File system data 453 may be stored as a flat set of data. In some embodiments, file system data 453 stores all data blocks associated with leaf nodes of a snapshot tree that were not previously archived. In other embodiments, file system data 453 stores the corresponding 1s and 0s of file data blocks associated with leaf nodes of a snapshot tree that were not previously archived. In some embodiments, file system data 453 stores a plurality of file data blocks in a single block of file system data 453. In some embodiments, the file system data includes file system metadata, such as file size, directory structure, file permissions, physical storage locations of the files, etc.

Serialized snapshot tree data 463 is a serialized version of one or more nodes of the snapshot tree at time t=2 and is represented as a flat set of data that is comprised of one or more blocks. Each block of the flat set of data corresponds to a node of the snapshot tree. Serialized snapshot tree data 463 includes a serialized representation of one or more changes to a snapshot tree (e.g., new node, modified node, deleted node) since a previous snapshot. Serialized snapshot tree data may include a block for each root node of a snapshot tree.

To determine whether a node should be included in a serialized snapshot tree data, the file system manager starts at the root node associated with a snapshot view and traverses the snapshot tree. At each node of the snapshot tree, the file system manager determines whether that particular node existed and is the same as the one in the previous snapshot tree. In the event the node didn't exist in the previous snapshot or is different when compared to the corresponding node in the previous snapshot tree, a block corresponding to the node is included in serialized snapshot tree data. In the event the node is determined to have existed in the previous snapshot tree and is also the same as the corresponding node in the previous snapshot tree, a block corresponding to the node is not included in the serialized snapshot tree data because a previous serialized snapshot tree data already includes a block corresponding to the node. Instead, a file offset to the block of the previous serialized snapshot tree data may be included in one or more of the blocks in the serialized snapshot tree data.

For example, to create a snapshot at t=2, root node 304 was added. The snapshot tree at t=2 indicates that the value of "DATA4" has been modified to be "DATA4'." Intermediate node 316 and leaf node 332 were added to the snapshot tree to ensure that each node along this path has a TreeID of "2."

In the example shown, serialized snapshot tree data 463 corresponds to the root nodes of the snapshot tree at t=2 and the new nodes of snapshot tree at t=2. Serialized snapshot tree data 463 is comprised of a plurality of blocks. Each block corresponds to one of the snapshot tree 350 nodes. For example, blocks 432, 416, 404 correspond to nodes 332, 316, 304, respectively. In other embodiments, serialized snapshot tree data corresponding to an incremental backup includes the root node associated with a snapshot view.

Block 404 corresponds to root node 304. Because root node 304 includes a pointer to intermediate node 312, block 404 includes a file offset to block 412 of serialized snapshot tree data 461. Previously stored serialized snapshot tree data 461 already includes block 412 that corresponds to intermediate node 312. A file offset to a previously stored serialized snapshot tree data is used to save memory and prevent storing duplicative data. Root node 304 also includes a pointer to intermediate node 316. Similarly, block 404 also includes a file offset to block 416, which corresponds to intermediate node 316.

Block 416 corresponds to intermediate node 316. Intermediate node 316 includes pointers to leaf nodes 330, 332. The value of leaf node 330 has not changed and was previously stored in file system metadata 451. To save memory and prevent storing duplicative data, block 416 includes a file offset to block 430 of serialized snapshot tree data 461. Block 416 also includes a file offset to block 432. Block 432 corresponds to leaf node 332. Intermediate node 316 is a new node because snapshot tree 300 did not include intermediate node 316. Thus, serialized snapshot tree data 463 includes a block that corresponds to intermediate node 316.

Block 432 corresponds to leaf node 332 of snapshot tree 350. Leaf node 332 is a new node because snapshot tree 300 did not include leaf node 332. Thus, serialized snapshot tree data 463 includes a block that corresponds to leaf node 332. Block 432 includes a file offset to one or more blocks in file system data 453 that store the value of leaf node 332.

FIG. 4C is a block diagram illustrating an embodiment of archive data. In the example shown, archive data 480 can be archived by a system, such as secondary storage system 104. In the example shown, archive data 480 includes file system data 455 and a serialized snapshot tree data 465.

File system data 455 is an incremental snapshot of the file system data stored in the one or more leaf nodes of a snapshot tree. For example, file system data 455 may include one or more values of the snapshot tree at time t=3 that were not previously archived. File system data 455 may be stored as a flat set of data. In some embodiments, file system data 455 stores all data blocks associated with leaf nodes of a snapshot tree that were not previously archived. In other embodiments, file system data 455 stores the corresponding 1s and 0s of file data blocks associated with leaf nodes of a snapshot tree that were not previously archived. In some embodiments, file system data 455 stores a plurality of file data blocks in a single block of file system data 455. In some embodiments, the file system data includes file system metadata, such as file size, directory structure, file permissions, physical storage locations of the files, etc.

Serialized snapshot tree data 465 is a serialized version of one or more nodes of the snapshot tree at time t=3 and is represented as a flat set of data that is comprised of one or more blocks. Each block of the flat set of data corresponds to a node of the snapshot tree. To create a snapshot at t=3, root node 306 was added. The snapshot tree indicates that the value of "DATA4'" has been modified to be "DATA4." Intermediate node 318 and leaf node 334 were added to the snapshot tree at t=3 to ensure that each node along this path has a TreeID of "3."

In the example shown, serialized snapshot tree data 465 corresponds to root nodes of the snapshot tree at time t=3 and the new nodes of snapshot tree at time t=3. Serialized snapshot tree data 465 is comprised of a plurality of blocks. Each block corresponds to one of the nodes of the snapshot tree at time t=3. For example, blocks 434, 418, 406 correspond to nodes 334, 318, 306, respectively.

Block 406 corresponds to root node 306. Because root node 306 includes a pointer to intermediate node 312, block 406 includes a file offset to block 412 of serialized snapshot tree data 461. Root node 306 includes a pointer to intermediate node 318. Similarly, block 406 includes a file offset to block 418, which corresponds to intermediate node 318.

Block 418 corresponds to intermediate node 318. Intermediate node 318 includes a pointer to leaf nodes 330, 334. The value of leaf node 330 has not changed and was previously stored in file system metadata 451. To save memory and prevent storing duplicative data, block 418 includes a file offset to block 430 of serialized snapshot tree data 467. Block 418 also includes a file offset to block 434. Block 434 corresponds to leaf node 334. Intermediate node 318 is a new node because snapshot tree 350 did not include intermediate node 318. Thus, archive data 480 includes a block that corresponds to intermediate node 318.

Block 434 corresponds to leaf node 334 of snapshot tree 380. Leaf node 334 is a new node because snapshot tree 350 did not include leaf node 334 at t=2. Thus, archive data 480 includes a block that corresponds to leaf node 334. Block 434 includes a file offset to a block of file system metadata 455 that stores the value of leaf node 334.

FIG. 4D is a block diagram illustrating an embodiment of archive data. In the example shown, archive data 490 can be archived by a storage system, such as secondary storage system 104. In the example shown, archive data 490 includes file system data 457 and a serialized snapshot tree data 467. In the example shown, archive data 490 is a file representation of snapshot tree at time t=4. Archive data 490 stores a full snapshot of the snapshot tree at time t=4. A full snapshot archive includes a representation of all of the nodes of a snapshot of a snapshot tree at a particular moment in time (i.e., all nodes associated with a root node of the snapshot tree) and the data stored in each of the leaf nodes of the snapshot tree.

In the example shown, serialized snapshot tree data 467 corresponds to the snapshot tree at t=4. Serialized snapshot tree data 467 is comprised of a plurality of blocks. Each block corresponds to one of the snapshot tree nodes. For example, blocks 422, 424, 426, 434, 430, 412, 418, and 408 correspond to nodes 322, 324, 326, 334, 330, 312, 318, and 308, respectively, of the snapshot tree at time t=4.

Block 408 corresponds to root node 308. Because root node 308 includes pointers to intermediate nodes 312 and 318, block 408 includes file offsets to blocks 412 and 418. Blocks 412 and 418 correspond to intermediate nodes 312 and 318, respectively. Because intermediate node 312 includes pointers to leaf nodes 322, 324, and 326, block 412 includes file offsets to blocks 422, 424, and 426. The file offsets correspond to the pointers of a snapshot tree. Similarly, block 418 includes file offsets to blocks 434, 430 because intermediate node 318 includes pointers to leaf nodes 334, 330.

Blocks 422, 424, 426, 434, and 430 correspond to the leaf nodes of snapshot tree 390 and each include a corresponding file offset to one or more blocks of the file system data stored in file system data 457. For example, block 422 includes an offset to one or more blocks in file system data 457 that stores the value of L1. Similarly, blocks 424, 426, 434, 430 include corresponding offsets to one or more blocks in file system data 457 that store the value of L2, L3, L7, and L5, respectively.

As seen in FIGS. 4A-4C, a serialized snapshot tree data may be linked with a previous serialized snapshot tree data. As more and more snapshots are archived, this may require a lot of storage to archive the serialized snapshot tree data. To reduce the amount of storage needed to store the archives, a policy may indicate that after a full snapshot archive, such as archive 490, is performed at a particular point in time, one or more previous archives may be deleted from cloud storage, i.e., archive data 400, 450, 480. For example, archive data 400, 450, 480 may be deleted after archive data 490 is archived. In some embodiments, the one or more previous snapshot archives are deleted after a condition associated with a retention time policy has passed. For example, a policy may indicate that data is to be archived for a period of thirty days.

Figure 5:
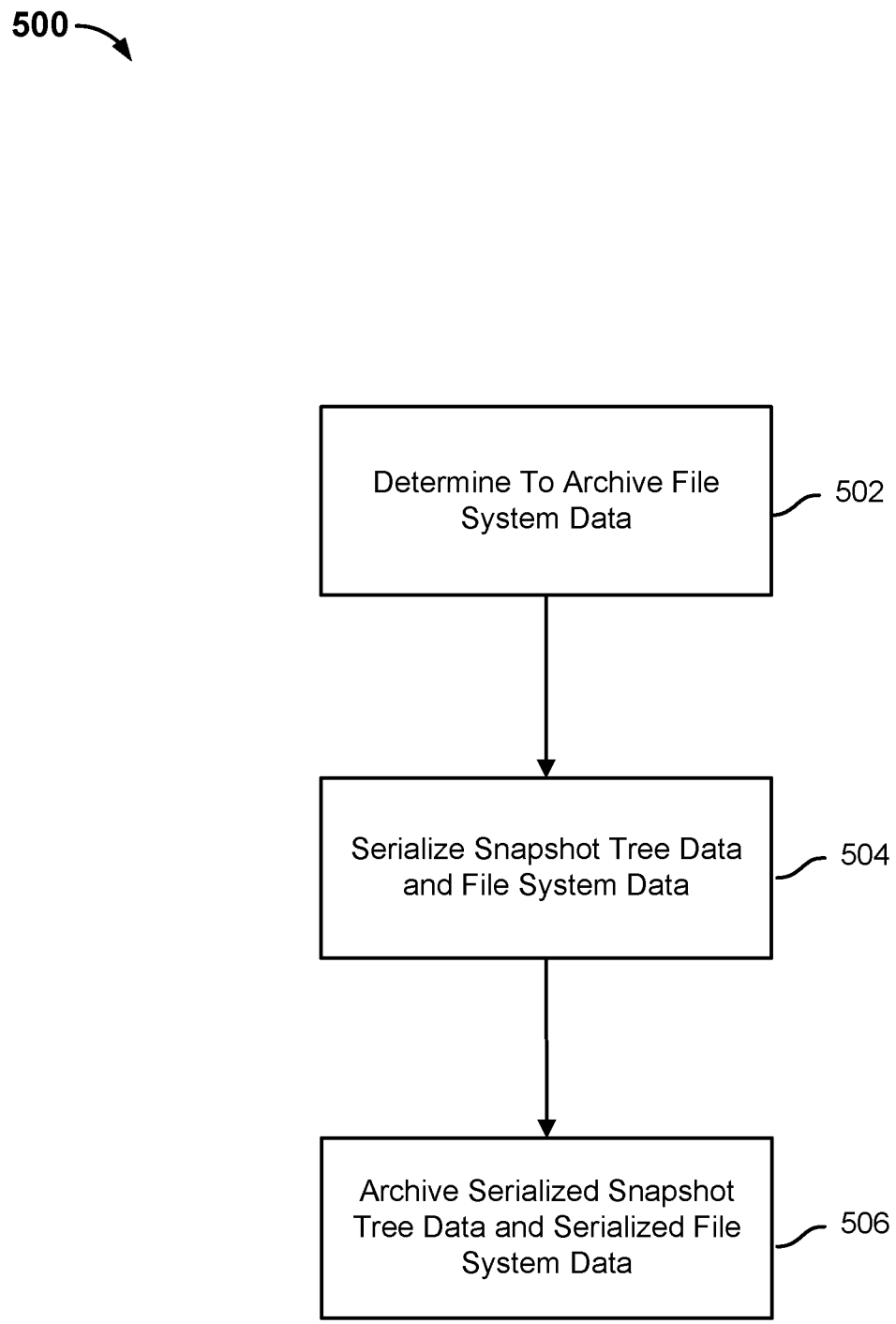
FIG. 5 is a flow chart illustrating an embodiment of archiving data.

FIG. 5 is a flow chart illustrating an embodiment of archiving data. In the example shown, process 500 may be implemented by a storage system, such as secondary storage system 104. In some embodiments, process 500 is a full snapshot archive. In other embodiments, process 500 is an incremental snapshot archive.

At 502, is it is determined that file system data is to be archived. A snapshot is the state of a system at a particular moment in time. A snapshot may be stored locally at a storage system, such as secondary storage system 104. A snapshot allows the state of a system to be rolled back to a moment in time for which a snapshot is stored. A system may store a large number of snapshots (e.g., thousands, millions). Each snapshot may require a significant amount of storage (e.g., GBs, TBs, PBs, etc.). In some instances, it may be desirable to archive a snapshot to a remote storage location, such as cloud storage 106 or cluster storage 108. The file system data associated with a snapshot may be archived to a remote storage location. An archive policy may indicate that a full snapshot archive of a snapshot or an incremental snapshot archive of the snapshot is to be performed and stored on a remote storage location. A full snapshot archive includes a complete view of one version of a snapshot tree at a particular moment in time. A full snapshot archive includes a root node associated with the view at the particular moment in time and any intermediate nodes and/or leaf nodes associated with the root node. A full snapshot archive does not include a node of a previous version of the snapshot tree if the node is not pointed to a node associated with the view at the particular moment in time. A full snapshot archive is similar to a full snapshot, except that the data associated with the full snapshot is stored at a remote location instead of on the storage system; that is, the full snapshot archive includes the data stored in each of the nodes associated with the snapshot tree at the particular moment in time. For example, a full snapshot archive associated with a snapshot at t=3, as depicted in FIG. 3C, includes root node 306, intermediate nodes 312, 318, and leaf nodes 322, 324, 326, 330, and 334.

An incremental snapshot archive includes a partial view of one version of a snapshot tree at a particular moment in time. An incremental snapshot archive includes a representation of what was not previously archived. An incremental snapshot archive is similar to an incremental snapshot, except that the data associated with the incremental snapshot archive is stored at a remote location instead of on the storage system; that is, the incremental snapshot archive includes the data stored in the leaf nodes of the snapshot tree that have not been previously archived. For example, an incremental snapshot archive associated with a snapshot at t=3, as depicted in FIG. 3C, includes root node 306, intermediate node 318, and leaf node 334. The incremental snapshot archive at t=3 does not include root nodes 302, 304, intermediates nodes 312, 314, 316, or leaf nodes 322, 324, 326, 328, 330 332 because those nodes were previously archived.

In some embodiments, the filesystem data is to be archived according to an archive policy. For example, an archive policy may indicate that a full snapshot archive is to be performed on a periodic basis (e.g., every W hour(s), every X day(s), every Y week(s), every Z month(s), etc.). An archive policy may indicate that a full snapshot archive is to be performed each time a full snapshot is performed. In some embodiments, an archive policy may indicate that one or more previous snapshot archives are to be deleted after a full snapshot archive is performed. In some embodiments, an archive policy may indicate that one or more file system data files and corresponding serialized snapshot tree data are to be deleted after a full snapshot archive is performed. An archive policy may indicate that an incremental snapshot archive is to be performed on a periodic basis (e.g., every W hour(s), every X day(s), every Y week(s), every Z month(s), etc.). An archive policy may indicate that an incremental snapshot archive is to be performed each time an incremental snapshot is performed. An archive policy may indicate that an incremental snapshot archive is to be performed on a more frequent basis than a full snapshot archive. The full snapshot archive and incremental snapshot archives are associated with a snapshot at a particular moment in time. For example, archive data 400 is associated with the snapshot tree at time t=1, archive data 450 is associated with the snapshot tree at time t=2, and archive data 480 is associated with the snapshot tree at time t=3. As seen in FIGS. 4A-4C, each snapshot archive builds off of a previous snapshot archive, that is, a block of serialized data includes a file offset to a block associated with previously serialized data. As more and more archives are created, this may require a lot of storage to store the archives. To reduce the amount of storage needed to store the archives, a policy may indicate that after a full snapshot archive, such as depicted in FIG. 4D, is performed at a particular point in time, one or more previous snapshot archives (i.e., archives 400, 450, 480) may be deleted from the remote storage location. In some embodiments, the one or more previous snapshot archives are deleted after a condition of retention time policy has passed.

At 504, a snapshot tree associated with a view is serialized into serialized snapshot tree data and file system data associated with the view is serialized into serialized file system data. Serializing the snapshot tree into serialized snapshot tree data creates a flat set of data that represents the snapshot tree. In some embodiments, the file system data may be stored in a tree data structure, such as the tree data structure depicted in FIG. 2E. Serializing the file system data into serialized file system data creates a flat set of data that represents the file system data. The snapshot tree and the file system data are serialized into flat sets of data because a remote location may be incapable of storing a tree data structure. In some embodiments, the view is a current view. A current view is a current perspective of the snapshot tree and one or more changes may be made to the snapshot tree. In other embodiments, the view is a snapshot view. A snapshot view is a perspective of the snapshot tree at a particular moment in time and one or more changes may not be made to the snapshot tree of the snapshot view.

The serialized snapshot tree data, i.e., a flat set of data, is comprised of one or more blocks. The serialized snapshot tree is a representation of a snapshot tree in block form. Each block of the serialized snapshot tree data corresponds to a node of a snapshot tree. Instead of a node having one or more pointers to one or more other nodes, a block of the serialized snapshot tree may include one or more file offsets to one or more other blocks. The file offsets represent the pointers of a snapshot tree. A block may include a file offset to another block in the serialized snapshot tree data. A block may include a file offset to another block in a previously serialized snapshot tree data. For example, a snapshot tree node may include a pointer to a node associated with a previous snapshot tree. A block that corresponds to the snapshot tree node may include a file offset to the block of a previously serialized snapshot tree data block that corresponds to the node associated with the previous snapshot tree. The snapshot tree node may also include a pointer to a node associated with the current snapshot tree. A block that corresponds to the snapshot tree node may include a file offset to the block of the current serialized snapshot tree data that corresponds to the node associated with the current snapshot tree.

The serialized file system data, i.e., a flat set of data, is comprised of one or more blocks. Each block of the serialized file system data corresponds to a data block or data segment of the file system data.

In some embodiments, a full snapshot is performed and the serialized snapshot tree data includes a plurality of blocks that correspond to the plurality of nodes of the snapshot tree. In some embodiments, one or more snapshots performed before the full snapshot are deleted. In other embodiments, an incremental snapshot is performed and the serialized snapshot tree data includes a plurality of blocks that correspond to the one or more root nodes and the one or more nodes that have been added to a snapshot tree since a previous archive. In some embodiments, an incremental snapshot is performed for a plurality of different snapshot trees and the corresponding serialized snapshot tree data includes file blocks corresponding to the plurality of different snapshot trees. In some embodiments, a serialized snapshot tree data combines the plurality of blocks that correspond to the one or more root nodes and the one or more nodes that have been added to a snapshot tree since a previous archive with one or more blocks from one or more previous archives.

At 506, the serialized snapshot tree data and serialized file system data are archived. The file system data is comprised of data blocks of a file and/or data segments of a file, and may be stored as a set of flat data. In some embodiments, the file system data is a full snapshot archive of the file system data stored in the one or more leaf nodes of a snapshot tree. Each of the data blocks/segments comprising the file system data stored in the one or more leaf nodes of a snapshot tree may be stored in the set of flat data. In some embodiments, the file system data is an incremental snapshot archive of the file system data stored in the one or more leaf nodes of a snapshot tree. The incremental snapshot archive may include changes to the data of a snapshot tree since a last snapshot archive (e.g., new data or modified data). Each of the data blocks/segments comprising the changes to the data of a snapshot tree since a last snapshot archive may be stored in the set of flat data. In some embodiments, the serialized snapshot tree data and file system data are archived to remote storage (e.g., cloud storage system, cluster storage system, etc.). The file system data may be stored in one or more files. File system metadata may be stored in one or more separate files. The file system metadata may include a reference to a file system data file and vice versa.

Figure 6A:
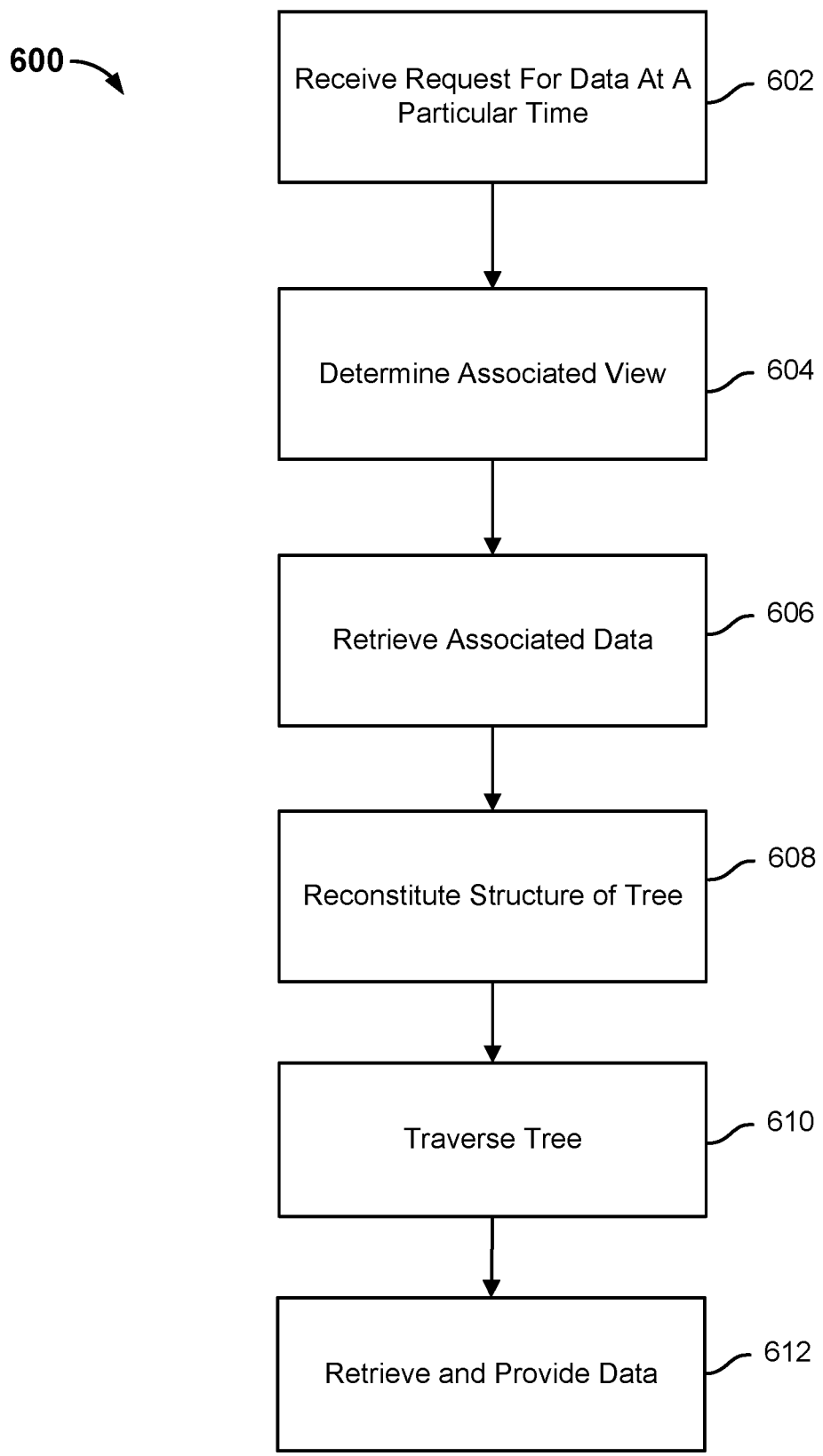
FIG. 6A is a flow chart illustrating an embodiment of restoring archived data.

FIG. 6A is a flow chart illustrating an embodiment of restoring archived data. In the example shown, process 600 may be performed by a storage system, such as secondary storage system 104.

At 602, a request for data at a particular time is received. The request may include a data key and the particular time. For example, a request for data associated with a data key of "4" at time t=3 may be received. The value associated with a data key is stored in a leaf node of a snapshot tree at the particular time. The snapshot tree may have been deleted from a storage system and archived to a remote storage location. The storage system may determine to access the requested value from a remote storage system by retrieving an archive that corresponds to the requested data at the particular time. For example, to determine the value associated with a data key of "4" at time t=3, a corresponding archive needs to be retrieved from a remote storage location.

To determine which archive(s) to retrieve from a remote storage location, at 604, a view associated with the particular time is determined. A snapshot tree has an identifier associated with a particular view. The snapshot tree having an identifier that matches the view associated with the particular time is determined. For example, a tree data structure has a root node with an identifier (e.g., TreeID=3) that matches the view associated with t=3. The view may be comprised of a root node, one or more intermediate nodes, and one or more leaf nodes. The value associated with the data key is stored in one of the leaf nodes of the view.

At 606, one or more archives of serialized snapshot tree data and one or more archives of file system data associated with the particular time are retrieved. An archive of file system data may comprise a first set of flat data. An archive of serialized snapshot tree data may comprise a second set of flat data. At least a portion of one or more file system archives 451, 453, 455 and at least a portion of one or more archives of serialized snapshot tree data 461, 463, 465 may be retrieved. In some embodiments, the archives are retrieved from a remote storage location, such as cloud storage or cluster storage. In some embodiments, data corresponding to a full snapshot archive is retrieved. In some embodiments, data corresponding to an incremental snapshot archive is retrieved. In some embodiments, data corresponding to a full snapshot archive and one or more incremental snapshot archives are retrieved.

At 608, a snapshot tree associated with the particular time is reconstituted. In some embodiments, the snapshot tree is reconstituted by deserializing serialized snapshot tree data associated with the particular time. In other embodiments, the snapshot tree is reconstituted by deserializing serialized snapshot tree data associated with the particular time and deserializing one or more other serialized snapshot tree data. In some embodiments, the one or more other serialized snapshot tree data were archived before the serialized snapshot tree data associated with the particular time. Reconstituting the structure of a snapshot tree at the particular time includes reading the flat set of data associated with the serialized snapshot tree data. The flat set of data includes blocks of data that correspond to nodes of a snapshot tree and associated file offsets that correspond to pointers of the snapshot tree.

For example, for the request of a value associated with a data key of "4" at time t=3, the snapshot tree at t=3 may be reproduced based on serialized snapshot tree data 465, 463, and 461. A file system manager may deserialize the serialized snapshot tree data. The snapshot tree at t=3 may be reproduced because serialized snapshot tree data 465 includes blocks that correspond to the root node 306 of the snapshot tree and offsets to blocks associated with intermediate nodes 312, 318.

Leaf node 334 may be reproduced because block 418 includes an offset to block 434, which corresponds to leaf node 334. The value associated with leaf node 334 may be accessed and reproduced because block 434 includes an offset to one or more blocks of data stored in file system data 455.

Leaf nodes 322, 324, 326 may be reproduced because block 406, which corresponds to root node 306, includes an offset to block 412 of serialized snapshot tree data 461. Block 412 of serialized snapshot tree data 461 corresponds to intermediate node 312. Block 412 includes an offset to blocks 422, 424, 426, which correspond to leaf nodes 322, 324, 326, respectively. The corresponding values associated with leaf nodes 322, 324, 326 may be accessed and reproduced because blocks 422, 424, 426 include file offsets to one or more blocks of data stored in file system data 451.

Leaf node 330 may be reproduced because block 418 of serialized snapshot tree data 465 includes an offset to block 430 of serialized snapshot tree data 461. Block 430 of serialized snapshot tree data 461 corresponds to leaf node 330. The value associated with leaf node 330 may be accessed and reproduced because block 430 includes an offset to one or more blocks of data stored in file system data 455.

In some embodiments, a partial tree data structure is reproduced by deserializing one or more serialized snapshot tree data associated with the particular time needed to determine the value associated with the requested data key. For example, for the request of a value associated with a data key of "4" at time t=3, a portion of tree data structure 380 may be reproduced based on serialized snapshot tree data 465. As seen in FIG. 3C, leaf node 334 has a data key-value pair of "4: DATA4"" and a TreeID of "3." Because a TreeID of "3" is associated with a snapshot tree view at t=3, the value stored in leaf node 334, as opposed to the value stored in leaf nodes 328, 332, is the value of a data key "4" at t=3. Although serialized snapshot tree data 465 includes file offsets to serialized snapshot tree data 461, 463, serialized snapshot tree data 461, 463 do not need to be deserialized because the requested value may be determined without deserializing those files. In some embodiments, a subset of the serialized snapshot tree data needed to produce the entire snapshot is deserialized to determine the value for a data key at the particular time.

At 610, the reproduced tree data structure is traversed. A view associated with a particular time has an associated TreeID. For example, a view at t=3 is associated with a TreeID of "3." The reproduced tree is traversed starting at a root node having a TreeID that is associated with the particular time. The reproduced tree is traversed based on the data key that is associated with the particular time. For example, for a request for a value associated with a data key of "4" at time t=3, tree data structure 380 may be traversed from root node 306 to intermediate node 318 to leaf node 334. Although leaf node 328 and leaf node 332 both have a data key of "4," tree data structure 380 is not traversed to either leaf node 328 or leaf node 332 because leaf nodes 328, 332 are associated with different views (e.g., leaf node 328 is associated with a view at time t=1 and leaf node 332 is associated with a view at time t=2) and intermediate node 318 does not include a pointer to leaf node 328 or 332. In some embodiments, the value associated with leaf node 334 indicates a current value associated with a data key of "4." In other embodiments, the value associated with leaf node 334 indicates the value associated with a data key of "4" at a particular point in time. In some embodiments, the leaf node includes a pointer to a location in file system data archive.

At 612, the requested data is retrieved from a remote storage location and provided. For example, for a request for a value associated with a data key of "4" at time t=3, a value of "DATA4''" may be retrieved from a file system data archive stored in cloud storage and provided. In some embodiments, the value is retrieved from archive data that was previously retrieved and stored on a storage system. In some embodiments, the value is retrieved from a remote storage location, such as a cloud storage system or a cluster storage system.

Figure 6B:
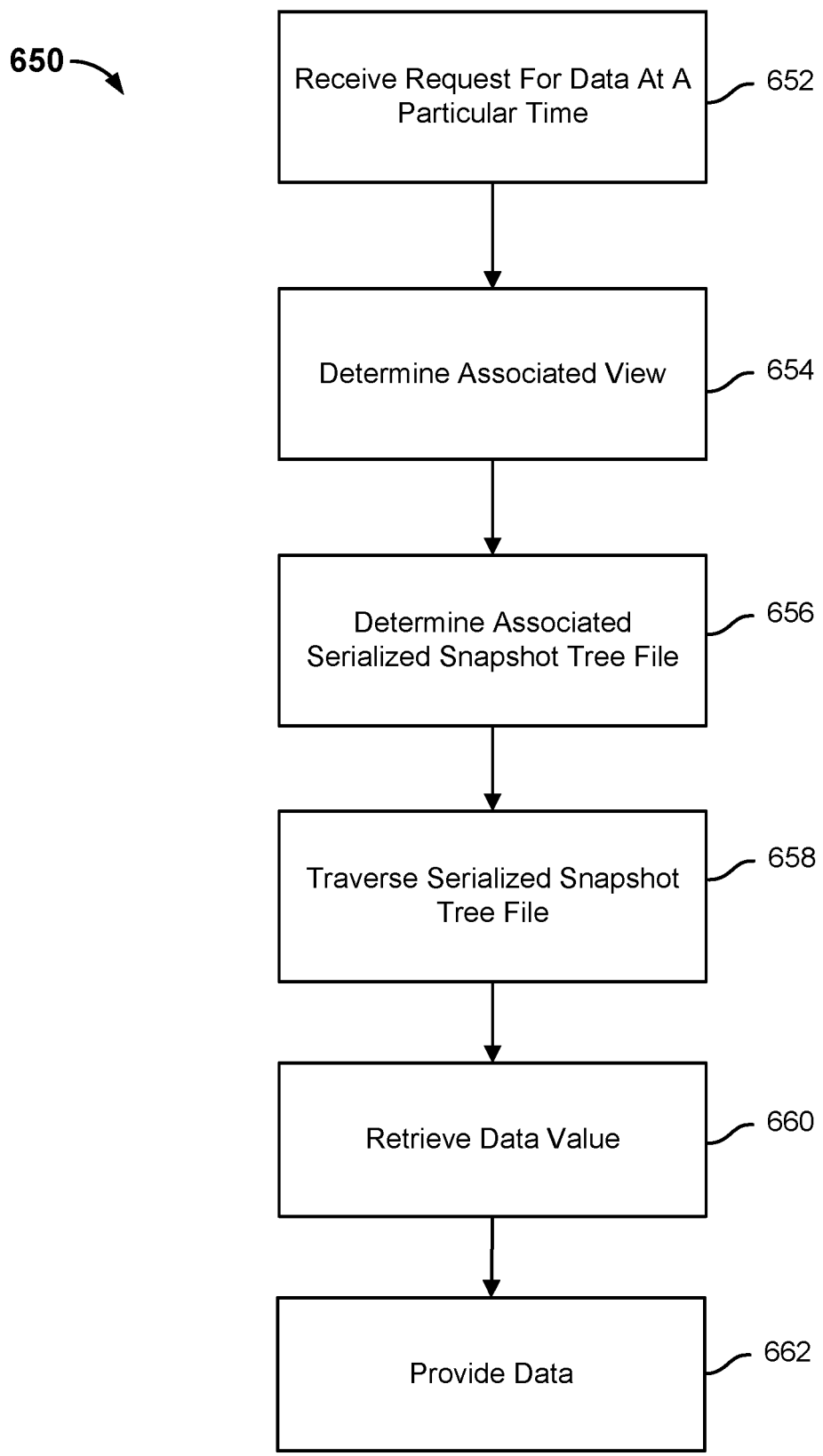
FIG. 6B is a flow chart illustrating an embodiment of retrieving archived data.

FIG. 6B is a flow chart illustrating an embodiment of retrieving archived data. In the example shown, process 650 may be performed by a storage system, such as secondary storage system 104.

At 652, a request for data at a particular time is received. The request may include a data key and the particular time. For example, a request for data associated with a data key of "4" at time t=3 may be received. The value associated with a data key is stored in a leaf node of a snapshot tree at the particular time. The snapshot tree may have been deleted from a storage system and archived to a remote storage location. The storage system may determine to access the requested value from a remote storage system by retrieving an archive that corresponds to the requested data at the particular time. For example, to determine the value associated with a data key of "4" at time t=3, a corresponding archive needs to be retrieved from a remote storage location.

To determine which archive(s) to retrieve from a remote storage location, at 654, a view associated with the particular time is determined. A snapshot tree has an identifier associated with a particular view. The snapshot tree having an identifier that matches the view associated with the particular time is determined. For example, a tree data structure 380 has a root node 306 with an identifier (e.g., TreeID=3) that matches the view associated with t=3. The view may be comprised of a root node, one or more intermediate nodes, and one or more leaf nodes. The value associated with the data key is stored in one of the leaf nodes of the view.

At 656, serialized snapshot tree data associated with the view is determined. For example, serialized snapshot file 465 is associated with a snapshot tree view at t=3. In some embodiments, the determined serialized snapshot tree data corresponds to a full snapshot. In some embodiments, the determined serialized snapshot tree data corresponds to an incremental snapshot archive. In some embodiments, the determined serialized snapshot tree data corresponds to a full snapshot archive and one or more incremental snapshot archives.

At 658, serialized snapshot tree data is traversed. Serialized snapshot tree data is a flat set of data and includes one or more blocks. One of the blocks corresponds to a root node associated with the particular view. For example, block 406 of serialized snapshot tree data 465 corresponds to root node 306 of tree data structure 380. Similar to traversing a snapshot tree from a root node to a leaf node, to find a value associated with a data key of "4" at time t=3, serialized snapshot tree data is traversed from block 406 to one or more blocks of file system data 455 based on file offsets included in the one or more blocks of serialized snapshot tree data 465. An initial block corresponding to a root node of a snapshot tree at the particular time is read to determine a file offset. The block with the file offset is read to determine whether the block includes a file offset to another block of serialized snapshot tree data or a file offset to one or more blocks of file system data. The block with the file offset is read and the process repeats until traversing the serialized snapshot tree data arrives at one or more blocks of file system data. For example, block 406 of serialized snapshot tree data 465 is read and it is determined that block 406 includes a file offset to block 418. Block 418 of serialized snapshot tree data 465 is read and it is determined that it includes a file offset to block 434. Block 434 of serialized snapshot tree data is read and it is determined that block 434 includes a file offset to one or more blocks of file system data 455.

At 660, the value associated with a data key is retrieved from remote storage. The value may be stored in one or more blocks of remote storage. At 662, the retrieved value associated with the data key is provided via a user interface. For example, the value "DATA4''" is provided.

Figure 7A:
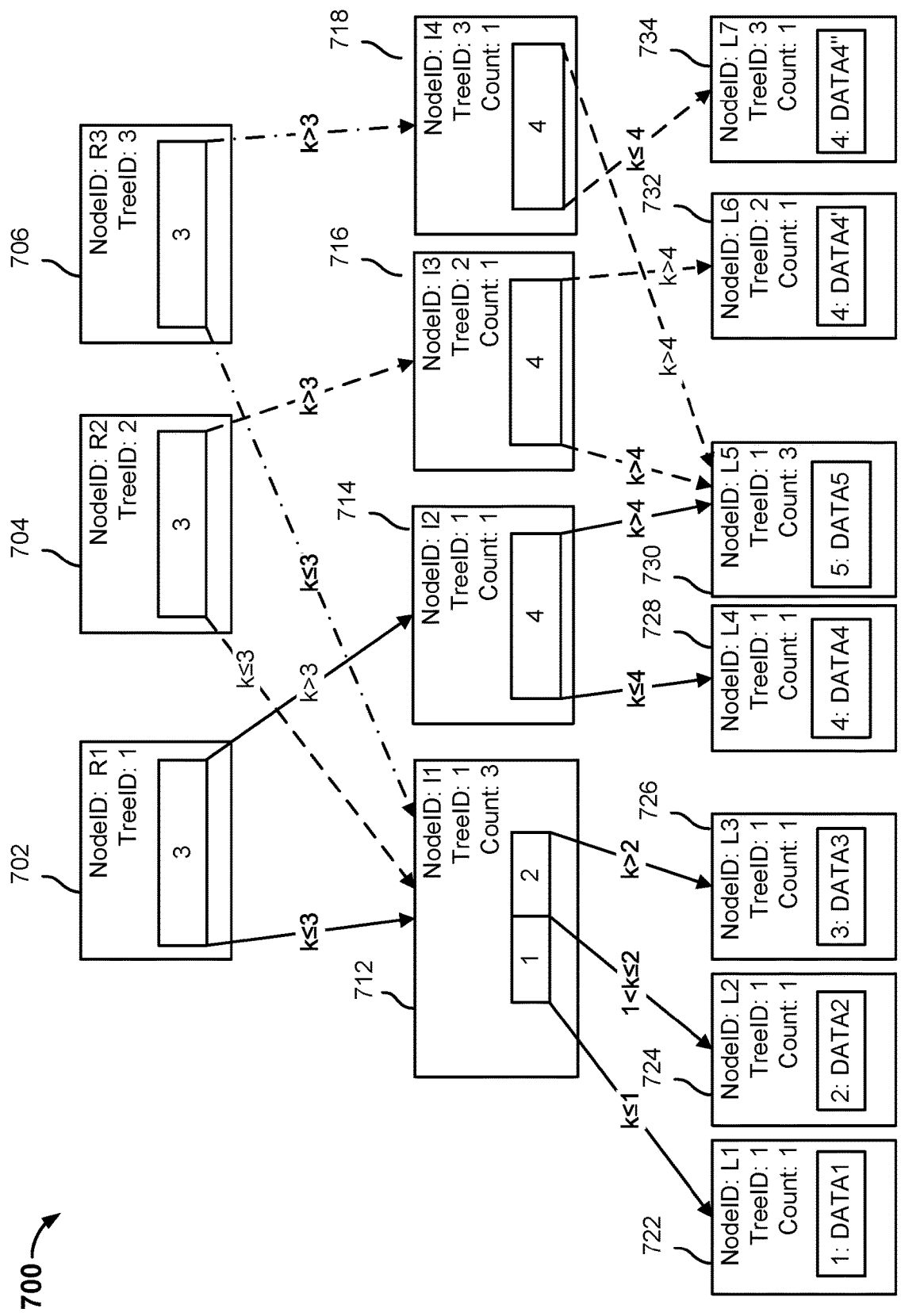
FIGS. 7A, 7B, and 7C are block diagrams illustrating an embodiment of maintaining a snapshot tree.
Figure 7B:
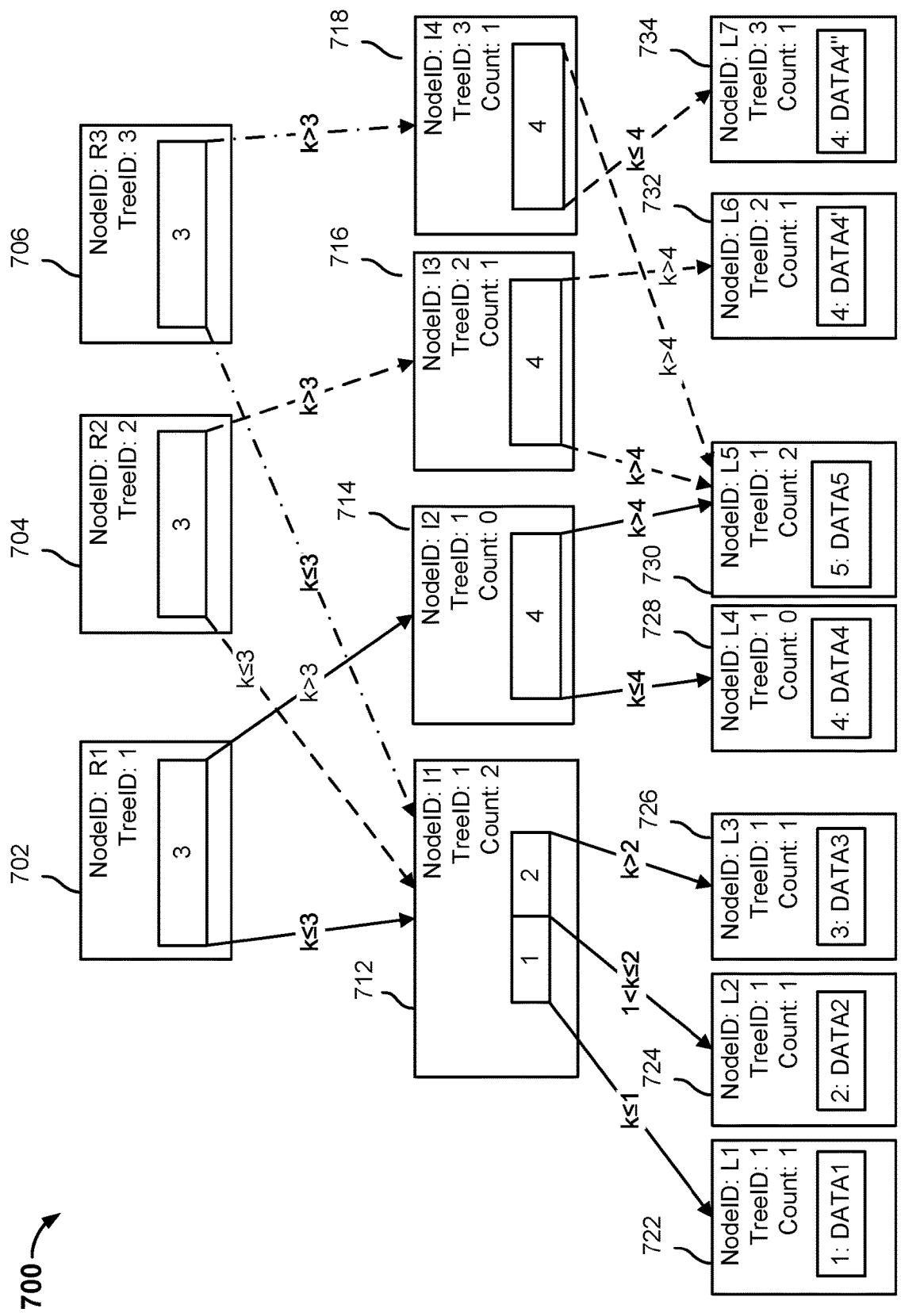
Figure 7C:
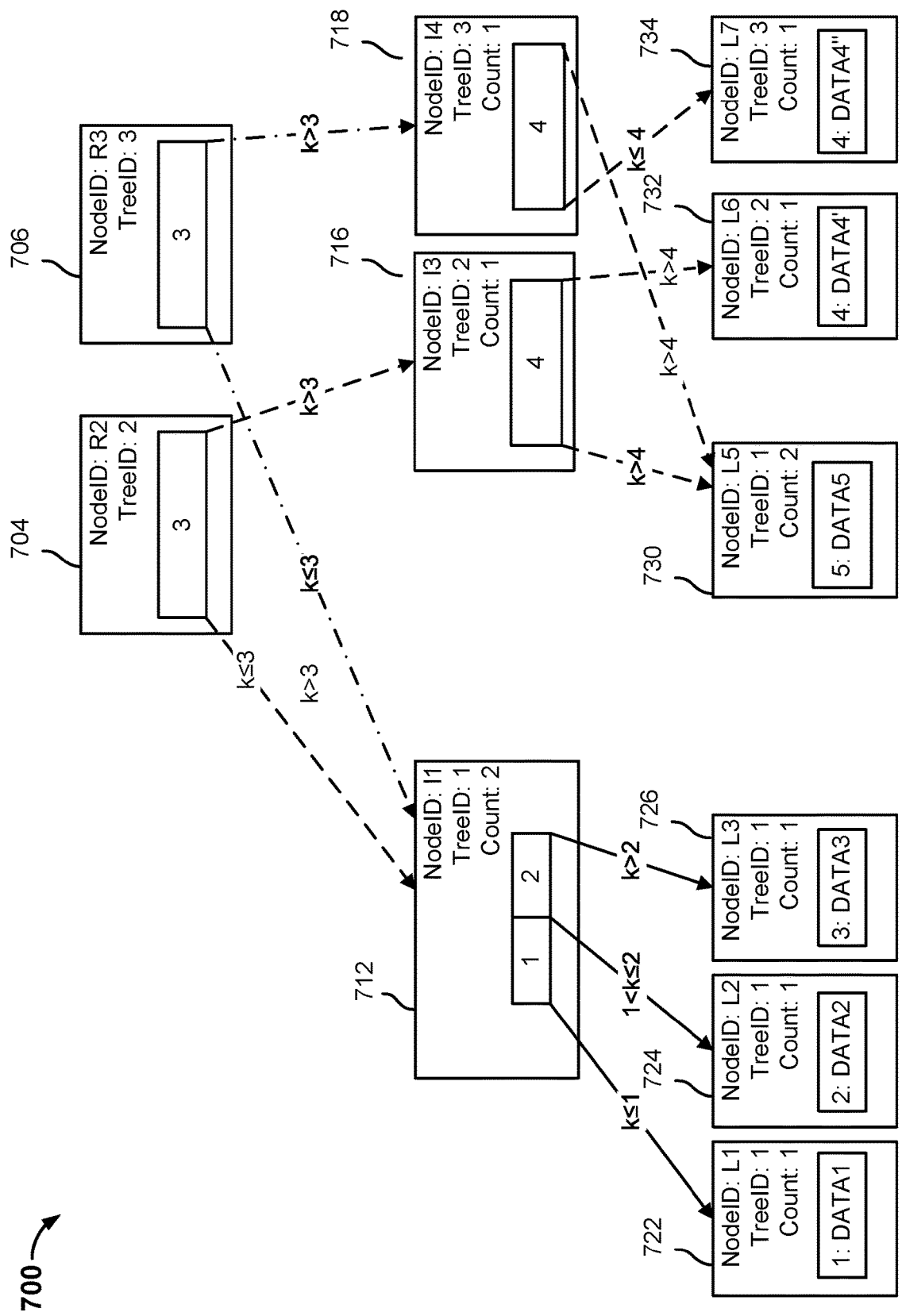

FIGS. 7A, 7B, and 7C are block diagrams illustrating an embodiment of maintaining a snapshot tree. In the example shown, tree data structure 700 can be maintained by a storage system, such as secondary storage system 104. Tree data structure 700 is similar to tree data structure 380 except that the intermediate nodes and leaf nodes have an associated count value. A count value of a node indicates a number of other nodes that include pointers to the node. A count value of a node is incremented each time another node includes a pointer to the node.

For example, intermediate node 712 has a count value of "3" because root nodes 702, 704, 706 include pointers to intermediate node 712. Intermediate node 714 has a count value of "1" because root node 702 is the only node that includes a pointer to intermediate node 714. Intermediate nodes 716, 718 have a count value of "1" and "1," respectively. Leaf nodes 722, 724, 726, 728, 730, 732, and 734 have a count value of "1," "1," "1," "1," "3," "1," and "1," respectively.

An associated snapshot tree view may have an associated retention time policy associated with it. For example, retention time policy may indicate that a snapshot tree view is to be deleted after a certain period of time (e.g., day(s), week(s), month(s), year(s), etc.). The retention time policy reduces the number of snapshot trees that a system is required to maintain and store in memory.

A snapshot tree view has an associated root node with a TreeID that associates the snapshot with a particular moment in time. For example, a snapshot tree associated with t=1 may have a root node with a TreeID of "1," a snapshot tree associated with t=2 may have a root node with a TreeID of "2," and a snapshot tree associated with t=3 may have a root node with a TreeID of "3."

In some embodiments, a retention time policy condition is satisfied (e.g., a snapshot tree view has been stored in memory for a particular amount of time) and it is determined to remove the snapshot tree view from memory. For example, it may be determined that a snapshot tree with a particular TreeID is to be stored for a particular amount of time. In the event the particular amount of time has passed, a file system manager may determine that the snapshot tree with the particular TreeID is to be removed from memory and/or storage. This reduces the storage needed to store snapshot trees and corresponding snapshots because the data contained in a snapshot may not be needed after a certain amount of time has passed. To remove a snapshot tree view from memory, the snapshot tree view is traversed along each branch and one or more nodes associated with the snapshot tree view are removed based on a count value associated with a node. In some embodiments, a retention time policy condition indicates that a full snapshot and associated incremental snapshots are to be removed from memory in the event a subsequent snapshot occurs.

For example, FIG. 7B depicts an embodiment where a retention time policy condition associated with a TreeID has been satisfied. Suppose a snapshot tree view associated with time t=1 is to be removed from memory. To determine which nodes to remove, each branch associated with root node 702 is traversed because root node 702 has a TreeID of "1," which is the snapshot tree view associated with time t=1. Root node 702 may be traversed to intermediate node 712. A count value associated with intermediate node 712 is decremented by one. In this example, the count value associated with intermediate node 712 is decremented from "3" to "2." Because the count value associated with intermediate node 712 is not "0," then the count values of the associated leaf nodes 722, 724, 726 retain their current values of "1." However, if the count value associated with intermediate node 712 was "0," then the count values associated with leaf nodes 722, 724, and 726 would also be decremented, such that the count value would change from "1" to "0."

Root node 702 may be traversed to intermediate node 714. A count value associated with intermediate node 714 is decremented by one. In this example, the count value associated with intermediate node 714 is decremented from "1" to "0." Because the count value associated with intermediate node 714 is "0," then tree data structure 700 is further traversed to leaf nodes 728, 730. The count value associated with leaf node 728 is decremented from "1" to "0." The count value associated with leaf node 730 is decremented from "3" to "2."

After all of the branches associated with a snapshot tree view have been traversed, the root node associated with the snapshot tree view and any nodes having a count value of "0" associated with the snapshot tree view are removed from memory. For example, as depicted in FIG. 7C, root node 702 is removed from memory because it is the root node associated with the snapshot tree view that is to be removed from memory. Intermediate node 714 and leaf node 728 are removed from memory because their corresponding count values are "0."

Figure 8:
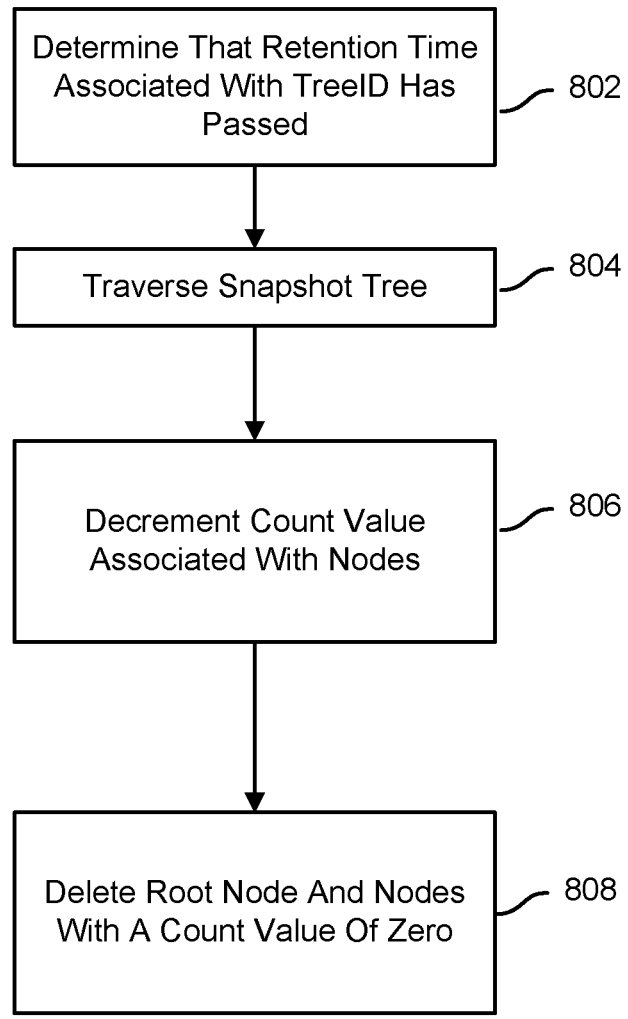
FIG. 8 is a flow chart illustrating an embodiment of maintaining a snapshot tree.

FIG. 8 is a flow chart illustrating an embodiment of maintaining a snapshot tree. In the example shown, process 800 can be performed by a storage system, such as secondary storage system 104.

At 802, it is determined that a snapshot tree associated with a particular view is to be deleted. In some embodiments, it is determined that a retention time associated with a snapshot tree having a particular TreeID has passed. For example, it may be determined that a snapshot tree view having a TreeID of "1" is to be removed from memory. In other embodiments, a user determines that a snapshot tree is to be deleted.

At 804, the snapshot tree is traversed. The snapshot tree is traversed to determine which nodes of the snapshot tree are to be deleted.

At 806, a corresponding count value of one or more nodes associated with the snapshot tree is decremented by one. In some embodiments, an intermediate node is pointed to by a plurality of root nodes and has a count value greater than one. For example, intermediate node 712, as seen in FIG. 7A, has a count value of "3" because root nodes R1, R2, R3 include a pointer to intermediate node 712. In the event decrementing the count value of the intermediate node causes the intermediate node to still have a count value that is greater than one, the count value of any nodes to which the intermediate node points is not decremented. For example, as seen in FIGS. 7A and 7B, a count value of intermediate node 712 is decremented from "3" to "2." Intermediate node 712 includes a pointer to leaf nodes 722, 724, 726. Since the count value associated with intermediate node 712 is greater than or equal to one, the count values associated with leaf nodes 722, 724, 726 are not decremented.

In some embodiments, an intermediate node is only pointed to by a root node associated with the snapshot tree having the particular ID. For example, intermediate node 714, as seen in FIG. 7A, has a count value of "1" because root node R1 includes a pointer to intermediate node 714. Such an intermediate node has a count value of one and the count value of the intermediate node is decremented from one to zero. The count value of any nodes pointed to by the intermediate node is also decremented by one. For example, as seen in FIGS. 7A and 7B, a count value of intermediate node 714 is decremented from "1" to "0." Intermediate node 714 includes a pointer to leaf nodes 728, 730. Since the count value associated with intermediate node 714 is less than one, the count value associated with leaf nodes 728, 730 is also decremented.

At 808, a root node associated with the snapshot tree having the particular TreeID and the one or more nodes having a count value of zero are deleted. The root node associated with the snapshot tree having the particular TreeID and the one or more nodes having a count value of zero may be removed from one or more snapshot views that reference the deleted nodes. For example, as seen in FIG. 7C, root node 702, intermediate node 714, and leaf node 728 are removed from a snapshot view. In some embodiments, the portions of memory of storage corresponding to a node having a count value of zero are cleared.

Figure 9:
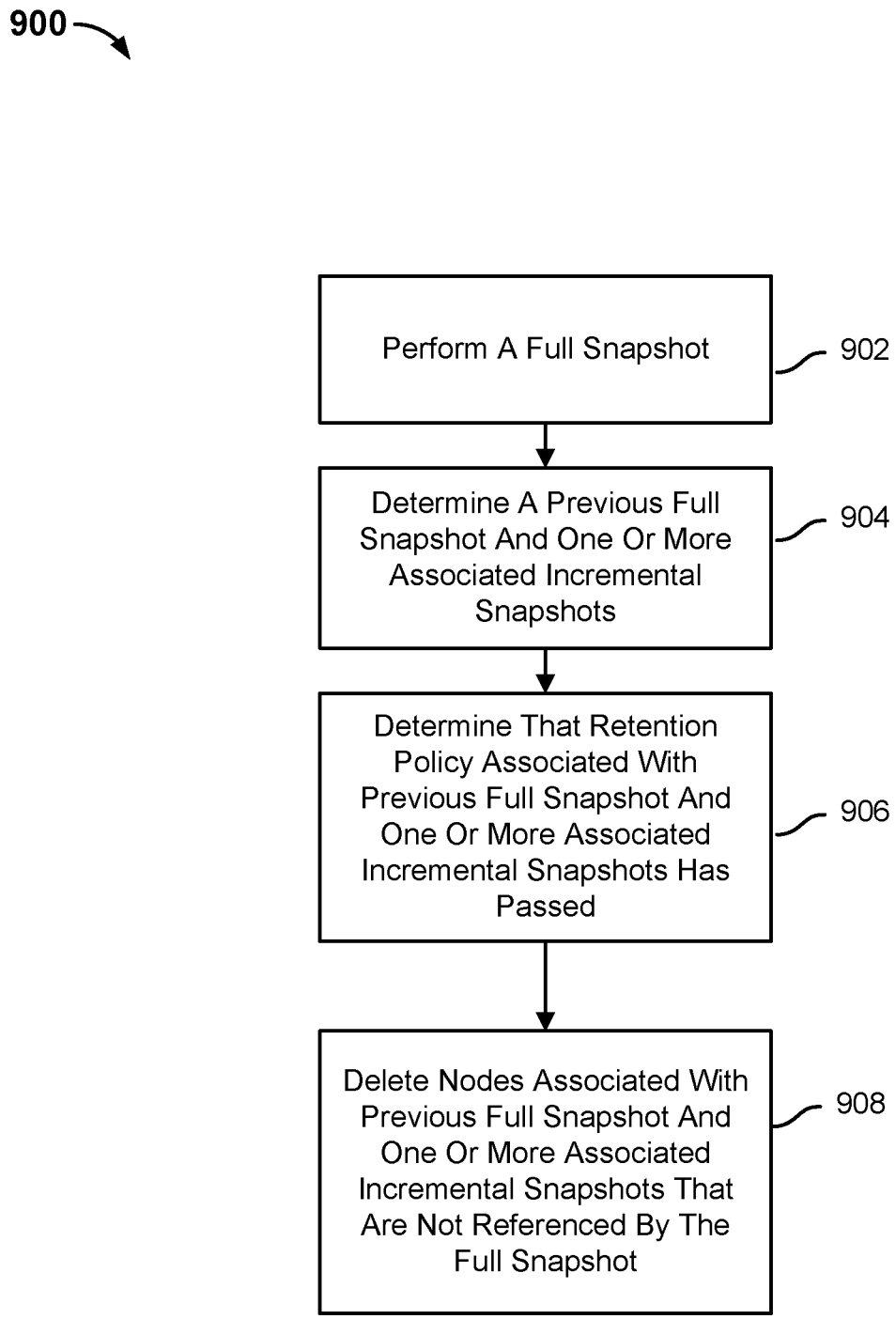
FIG. 9 is a flow chart illustrating an embodiment of deleting archived snapshots.

FIG. 9 is a flow chart illustrating an embodiment of deleting archived snapshots. In the example shown, process 900 can be performed by a storage system, such as secondary storage system 104.

At 902, a full snapshot archive of a snapshot tree is performed. A snapshot represents a snapshot tree at a particular moment in time. The full snapshot archive includes all of the nodes of a snapshot tree at the particular moment in time. An incremental snapshot archive includes all of the nodes of a snapshot tree that have been added to a snapshot since a previous snapshot. A policy may indicate that a full snapshot archive is to be performed on a periodic basis, by command from a user, and/or after a threshold number of incremental snapshots have been performed.

At 904, a previous full snapshot and one or more associated incremental snapshots are determined. A snapshot tree may include nodes associated with one or more previous snapshots. For example, tree data structure 380 includes a root node 306 that is associated with nodes associated with a previous snapshot tree (nodes 312, 322, 324, 326, 330).

At 906, it is determined that a retention policy associated with the previous full snapshot and one or more associated incremental snapshots has passed. For example, to save storage space, a retention policy may indicate that a snapshot is to be deleted after a certain amount of time has passed.

At 908, nodes that are not part of a snapshot associated with a full snapshot archive, such as nodes from the previous full snapshot and one or more associated incremental snapshots, are deleted from the storage system. For example, root nodes 302, 304, 306, intermediate nodes 314, 316, and leaf nodes 328, 332 may be deleted when a full snapshot archive of snapshot tree associated with time t=4 is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of accessing tree data, comprising:
   serializing at least a first portion of data of a tree data structure into a first set of flat data;
   serializing at least a first portion of a structure of the tree data structure to reproduce at least the portion of the structure in a second set of flat data, wherein the first portion of the structure of the tree data structure includes a first root node and the second set of flat data includes a block corresponding to the first root node;
   determining to access a desired data of the tree data structure from an archive;
   reading a portion of the second set of flat data to reconstitute at least the first portion of the structure of the tree data structure, wherein the read portion of the second set of flat data includes one or more references to a third set of flat data, wherein the third set of flat data corresponds to a second portion of the structure of the tree data structure, wherein the second portion of the structure of the tree data structure includes a second root node and one or more other nodes, wherein the third set of flat data includes a block corresponding to the second root node and one or more blocks corresponding to the one or more other nodes, wherein the third set of flat data includes one or more references to a fourth set of flat data corresponding to a second portion of data of the tree data structure;
   reading a portion of the third set of flat data to reconstitute a portion of the structure of the tree data structure corresponding to the one or more other nodes of the tree data structure;
   reconstituting the at least the first portion of the structure of the tree data structure and the portion of the structure of the tree data structure corresponding to the one or more other nodes of the tree data structure;
   using the reconstituted structure portions of the tree data structure to determine a data offset associated with the fourth set of flat data, wherein the data offset corresponds to the desired data; and
   accessing the desired data using the data offset associated with the fourth set of flat data.

2. The method of claim 1, wherein reading the second set of flat data to reconstitute at least the first portion of the structure of the tree data structure includes deserializing the serialized first portion of the structure of the tree data structure.

3. The method of claim 1, further comprising retrieving the second set of flat data from a remote storage location.

4. The method of claim 1, wherein the tree data structure at least includes the first root node and one or more leaf nodes.

5. The method of claim 4, wherein at least one of the one or more leaf nodes stores values in a format.

6. The method of claim 1, wherein the first set of flat data is comprised of a first set of blocks and the second set of flat data is comprised of a second set of blocks, wherein a block of the second set of blocks includes the data offset to at least one of the first set of blocks.

7. The method of claim 6, further comprising retrieving the first set of flat data from a remote storage location.

8. The method of claim 1, wherein the second set of flat data includes a data offset to the third set of flat data.

9. The method of claim 8, wherein the second set of flat data corresponds to a snapshot of the tree data structure at a particular time.

10. The method of claim 9, wherein the third set of flat data corresponds to a different snapshot of the tree data structure at a different time, wherein the different snapshot of the tree data structure was captured before the snapshot of the tree data structure at the particular time.

11. The method of claim 10, wherein the snapshot of the tree data structure at the particular time includes a root node copy of a root node associated with the different snapshot of the tree data structure, wherein the root node copy and the root node include a pointer to an intermediate node associated with the different snapshot.

12. The method of claim 1, further comprising:
    receiving a request for the desired data at a specified time;
    determining a snapshot view associated with the specified time, wherein the second set of flat data corresponds to a snapshot view of the tree data structure at the specified time; and
    retrieving the second set of flat data associated with the specified time.

13. The method of claim 1, further comprising:
    determining that an archive policy condition has occurred; and
    archiving the first set of flat data and the second set of flat data to a remote storage location.

14. The method of claim 13, wherein the archive policy condition causes a complete tree structure to be serialized.

15. The method of claim 13, wherein the archive policy condition causes an incremental tree structure to be serialized.

16. The method of claim 1, wherein a node of the tree data structure includes a count value.

17. The method of claim 16, wherein the node of the tree data structure is removed from the tree data structure in the event the count value is zero.

18. The method of claim 16, wherein the count value indicates a number of other nodes that include a pointer to the node.

19. A system for accessing tree data, comprising:
    a processor; and
    a memory coupled with the processor, wherein the memory is configured to provide the processor with instructions which when executed cause the processor to:

serialize at least a first portion of data of a tree data structure into a first set of flat data;

serialize at least a first portion of a structure of the tree data structure to reproduce at least the portion of the structure in a second set of flat data, wherein the first portion of the structure of the tree data structure includes a first root node and the second set of flat data includes a block corresponding to the first root node;

determine to access a desired data of the tree data structure from an archive;

read a portion of the second set of flat data to reconstitute at least the first portion of the structure of the tree data structure, wherein the read portion of the second set of flat data includes one or more references to a third set of flat data, wherein the third set of flat data corresponds to a second portion of the structure of the tree data structure, wherein the second portion of the structure of the tree data structure includes a second root node and one or more other nodes, wherein the third set of flat data includes a block corresponding to the second root node and one or more blocks corresponding to the one or more other nodes, wherein the third set of flat data includes one or more references to a fourth set of flat data corresponding to a second portion of data of the tree data structure;

read a portion of the third set of flat data to reconstitute a portion of the structure of the tree data structure corresponding to the one or more other nodes of the tree data structure;

reconstitute the at least the first portion of the structure of the tree data structure and the portion of the structure of the tree data structure corresponding to the one or more other nodes of the tree data structure;

use the reconstituted structure portions of the tree data structure to determine a data offset associated with the fourth set of flat data, wherein the data offset corresponds to the desired data; and access the desired data using the data offset associated with the fourth set of flat data.

20. A computer program product for accessing tree data, the computer program product being embodied in a non-transitory computer readable storage medium and comprising computer instructions for:

serializing at least a first portion of data of a tree data structure into a first set of flat data;

serializing at least a first portion of a structure of the tree data structure to reproduce at least the portion of the structure in a second set of flat data, wherein the first portion of the structure of the tree data structure includes a first root node and the second set of flat data includes a block corresponding to the first root node;

determining to access a desired data of the tree data structure from an archive;

reading a portion of the second set of flat data to reconstitute at least the first portion of the structure of the tree data structure, wherein the read portion of the second set of flat data includes one or more references to a third set of flat data, wherein the third set of flat data corresponds to a second portion of the structure of the tree data structure, wherein the second portion of the structure of the tree data structure includes a second root node and one or more other nodes, wherein the third set of flat data includes a block corresponding to the second root node and one or more blocks corresponding to the one or more other nodes, wherein the third set of flat data includes one or more references to a fourth set of flat data corresponding to a second portion of data of the tree data structure;

reading a portion of the third set of flat data to reconstitute a portion of the structure of the tree data structure corresponding to the one or more other nodes of the tree data structure;

reconstituting the at least the first portion of the structure of the tree data structure and the portion of the structure of the tree data structure corresponding to the one or more other nodes of the tree data structure;

using the reconstituted structure portions of the tree data structure to determine a data offset associated with the fourth set of flat data, wherein the data offset corresponds to the desired data; and accessing the desired data using the data offset associated with the fourth set of flat data.

\* \* \* \* \*